(12) United States Patent
Kim et al.

(10) Patent No.: US 11,861,192 B2
(45) Date of Patent: Jan. 2, 2024

(54) STORAGE CONTROLLER REDIRECTING WRITE OPERATION AND OPERATING METHOD THEREOF

(71) Applicant: SAMSUNG ELECTRONICS CO., LTD., Suwon-si (KR)

(72) Inventors: Minji Kim, Suwon-si (KR); Sangwon Jung, Busan (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 113 days.

(21) Appl. No.: 17/526,243

(22) Filed: Nov. 15, 2021

(65) Prior Publication Data

US 2022/0283720 A1 Sep. 8, 2022

(30) Foreign Application Priority Data

Mar. 2, 2021 (KR) .................. 10-2021-0027516

(51) Int. Cl.
*G06F 12/00* (2006.01)
*G06F 3/06* (2006.01)

(52) U.S. Cl.
CPC ............ *G06F 3/0634* (2013.01); *G06F 3/064* (2013.01); *G06F 3/0617* (2013.01);
(Continued)

(58) Field of Classification Search
CPC .... G06F 3/0634; G06F 3/0617; G06F 3/0619; G06F 3/064; G06F 3/0659; G06F 3/0679; G06F 2212/1044; G06F 2212/7202; G06F 2212/7207; G06F 12/0246; G06F 3/061; G06F 3/0649; G06F 3/0616; G06F 3/0653; G06F 2212/1016; G06F 2212/1032
(Continued)

(56) References Cited

U.S. PATENT DOCUMENTS 10,254,998 B2  4/2019  Sinha et al.
10,459,662 B1  10/2019  Volpe et al.
(Continued)

FOREIGN PATENT DOCUMENTS

CA  2894936 C  * 2/2018  ......... G06F 12/0246
CN  1026223306  * 1/2009
(Continued)

*Primary Examiner* — Mardochee Chery
(74) *Attorney, Agent, or Firm* — Muir Patent Law, PLLC

(57) ABSTRACT

Disclosed is an operating method of a storage controller communicating with a host and memory regions, which includes receiving a write request for a first memory region of the memory regions from the host, determining the first memory region as unavailable, based on a status information set, generating redirection information indicating that a second memory region of the memory regions is selected instead of the first memory region, performing a write operation in the second memory region based on the redirection information, updating status information of the second memory region in the status information set based on the write operation, outputting redirection result information indicating that write data of the write request are processed in the second memory region, to the host, and receiving a read request corresponding to the write data and including information of the second memory region from the host.

20 Claims, 16 Drawing Sheets

(52) U.S. Cl.
CPC .......... _G06F 3/0619_ (2013.01); _G06F 3/0659_ (2013.01); _G06F 3/0679_ (2013.01)

(58) Field of Classification Search
USPC ........................................................ 711/154
See application file for complete search history.

(56) References Cited

U.S. PATENT DOCUMENTS

| | | |
|---|---|---|
| RE47,946 E | 4/2020 | Nagadomi et al. |
| 2014/0215129 A1 | 7/2014 | Kuzmin et al. |
| 2015/0301747 A1* | 10/2015 | Sokolov ................ G06F 3/0673 711/173 |
| 2016/0041767 A1* | 2/2016 | Kitsunai ................. G06F 3/064 711/103 |
| 2018/0150422 A1 | 5/2018 | Tipton et al. |
| 2019/0073126 A1 | 3/2019 | Lee |
| 2020/0285391 A1 | 9/2020 | Sun et al. |
| 2021/0157528 A1 | 5/2021 | Kim et al. |

FOREIGN PATENT DOCUMENTS

| | | | | |
|---|---|---|---|---|
| CN | 108763099 A | * | 11/2018 | ......... G06F 12/0246 |
| JP | 2011-048852 A | | 3/2011 | |
| KR | 10-2020-0053204 A | | 5/2020 | |

* cited by examiner

FIG. 5A

| Status Information for # Memory Region |||
|---|---|---|
| Index | Contents | Value |
| 1 | Average Erase Count | 200 |
| 2 | VPC (Valid Page Count) Ratio (%) | 100 |
| 3 | Number of Bad Block | 6 |
| 4 | WAF (Write Amplification Factor) | 5 |
| 5 | Memory Usage Ratio (%) | 65 |

FIG. 5B

| \_\_\_\_\_ | SI1 | \_\_\_\_\_ |
|---|---|---|
| Index | Contents | Value |
| 1 | Average Erase Count | 200 |
| 2 | VPC Ratio (%) | 100 |
| 3 | Number of Bad Block | 6 |
| 4 | WAF | 5 |
| 5 | Memory Usage Ratio (%) | 65 |

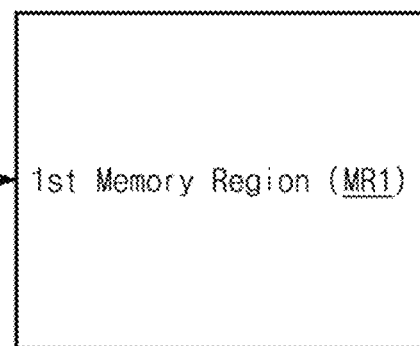
1st Memory Region (MR1)

| \_\_\_\_\_ | SI2 | \_\_\_\_\_ |
|---|---|---|
| Index | Contents | Value |
| 1 | Average Erase Count | 300 |
| 2 | VPC Ratio (%) | 70 |
| 3 | Number of Bad Block | 10 |
| 4 | WAF | 2 |
| 5 | Memory Usage Ratio (%) | 85 |

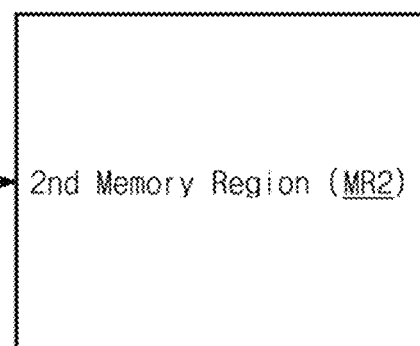
2nd Memory Region (MR2)

| \_\_\_\_\_ | SI3 | \_\_\_\_\_ |
|---|---|---|
| Index | Contents | Value |
| 1 | Average Erase Count | 200 |
| 2 | VPC Ratio (%) | 80 |
| 3 | Number of Bad Block | 5 |
| 4 | WAF | 4 |
| 5 | Memory Usage Ratio (%) | 30 |

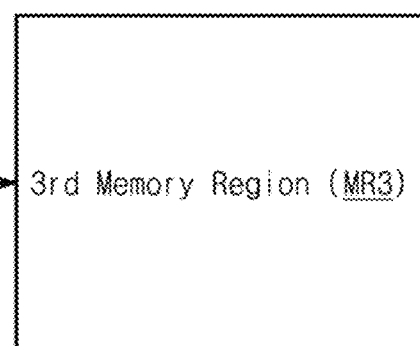
3rd Memory Region (MR3)

| \_\_\_\_\_ | SI4 | \_\_\_\_\_ |
|---|---|---|
| Index | Contents | Value |
| 1 | Average Erase Count | 500 |
| 2 | VPC Ratio (%) | 70 |
| 3 | Number of Bad Block | 7 |
| 4 | WAF | 1 |
| 5 | Memory Usage Ratio (%) | 90 |

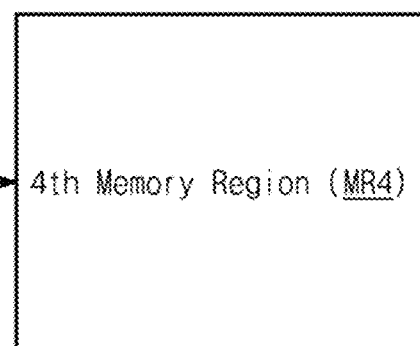
4th Memory Region (MR4)

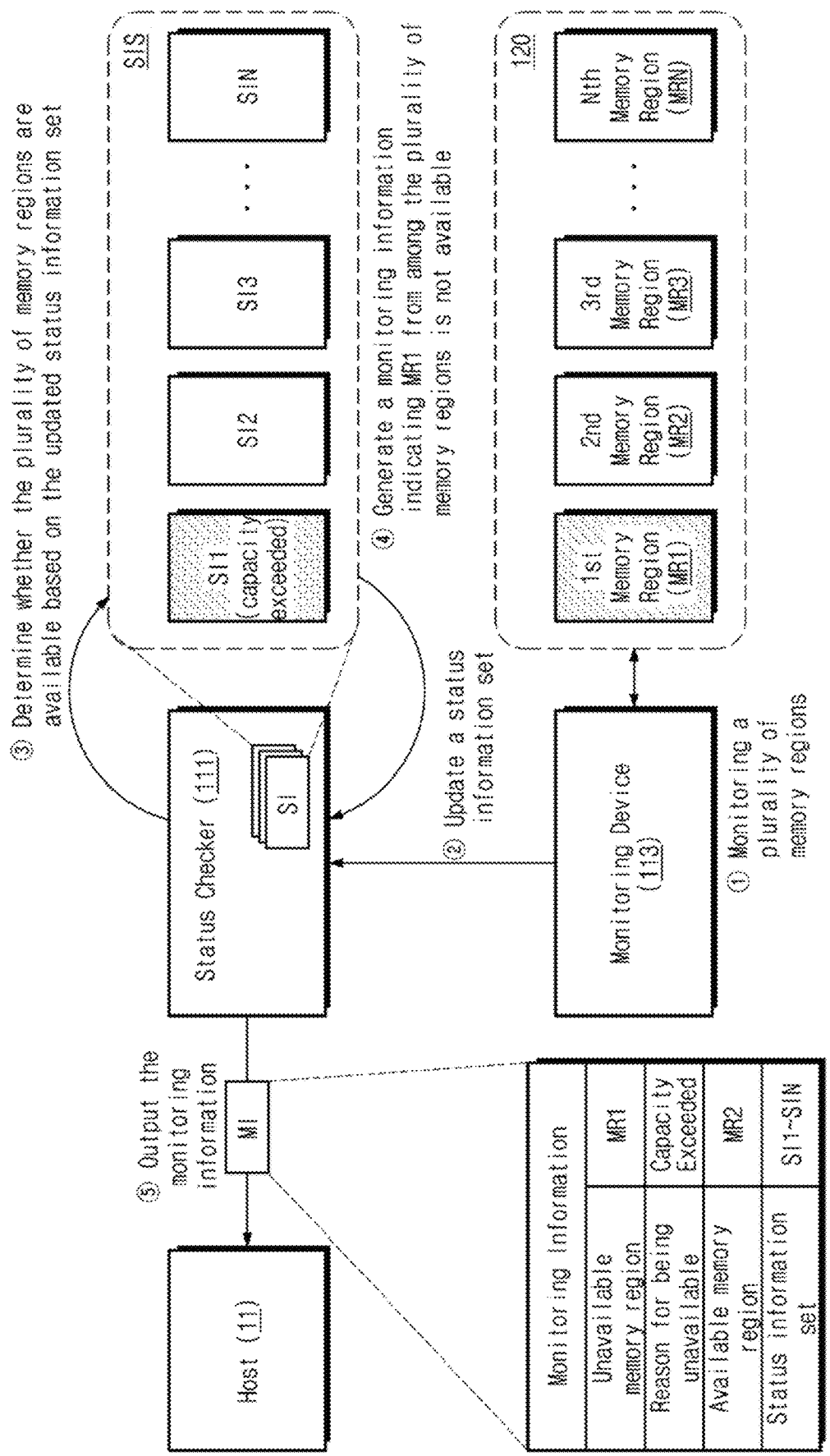

FIG. 9

| Available Memory Conditions | | |
|---|---|---|
| Index | Contents | Bit Flag |
| 1 | Average erase count of corresponding memory region-Minimum of a plurality of average erase counts for a plurality of memory regions < Erase count threshold value | 1 |
| 2 | Valid page count ratio of corresponding memory region < Maximum of a plurality of valid page count ratios for the plurality of memory regions | 0 |
| 3 | Number of bad block of corresponding memory region < Maximum of numbers of bad blocks for the plurality of memory regions | 0 |
| 4 | WAF of corresponding memory region < WAF threshold value | 0 |
| 5 | Memory usage ratio of corresponding memory region (%) < Usage ratio threshold value (e.g. 100%) | 0 |

STORAGE CONTROLLER REDIRECTING WRITE OPERATION AND OPERATING METHOD THEREOF

CROSS-REFERENCE TO RELATED APPLICATION

This application claims priority under 35 U.S.C. § 119 to Korean Patent Application No. 10-2021-0027516 filed on Mar. 2, 2021, in the Korean Intellectual Property Office, the disclosure of which is incorporated by reference herein in its entirety.

BACKGROUND

1. Field

Embodiments relate to a storage controller and an operating method thereof.

2. Description of the Related Art

A memory device stores data in response to a write request and outputs data stored therein in response to a read request. For example, a memory device is classified as a volatile memory device, which loses data stored therein when a power supply is interrupted, such as a dynamic random access memory (DRAM) device, a static RAM (SRAM) device, or a non-volatile memory device, which retains data stored therein even when a power supply is interrupted, such as a flash memory device, a phase-change RAM (PRAM), a magnetic RAM (MRAM), or a resistive RAM (RRAM).

SUMMARY

According to an embodiment, an operating method of a storage controller which communicates with a host and a plurality of flash memory regions includes receiving a write request for a first flash memory region of the plurality of flash memory regions from the host, determining the first flash memory region as unavailable, based on a status information set, generating redirection information indicating that a second flash memory region of the plurality of flash memory regions is selected instead of the first flash memory region, performing a write operation in the second flash memory region based on the redirection information, updating status information of the second flash memory region in the status information set based on the write operation, outputting redirection result information indicating that write data of the write request are processed in the second flash memory region, to the host, and receiving a read request corresponding to the write data and including information of the second flash memory region from the host.

According to an embodiment, an operating method of a storage controller which communicates a host and a plurality of flash memory regions includes monitoring the plurality of flash memory regions, updating a status information set based on the monitoring, wherein the status information set includes a plurality of status information respectively corresponding to the plurality of flash memory regions, determining whether the plurality of flash memory regions are available, based on the updated status information set, generating monitoring information indicating that a first flash memory region of the plurality of flash memory regions is unavailable, based on a result of the determination, and outputting the monitoring information to the host.

According to an embodiment, a storage controller includes a status checker that generates a status information set corresponding to a plurality of flash memory regions including a first flash memory region and a second flash memory region, determines that the first flash memory region does not satisfy available memory conditions, based on the status information set, and determines that the second flash memory region satisfies the available memory conditions, based on the status information set, and an interface circuit that outputs, to a host, first information indicating that the first flash memory region does not satisfy the available memory conditions and second information indicating that the second flash memory region satisfies the available memory conditions. The available memory conditions include one or more of a condition where a value obtained by subtracting a minimum value of a plurality of average erase counts of the plurality of flash memory regions from an average erase count of a corresponding flash memory region is smaller than a first threshold value, a condition where a valid page count ratio of the corresponding flash memory region is smaller than a maximum value of a plurality of valid page count ratios of the plurality of flash memory regions, a condition where a number of bad blocks of the corresponding flash memory region is smaller than a maximum value of the numbers of bad blocks of the plurality of flash memory regions, a condition where a write amplification factor of the corresponding flash memory region is smaller than a second threshold value, and a condition where a memory usage ratio of the corresponding flash memory region is smaller than a third threshold value.

BRIEF DESCRIPTION OF THE FIGURES

Features will become apparent to those of skill in the art by describing in detail example embodiments with reference to the attached drawings in which:

FIGS. 5A and 5B are diagrams for describing status information of a memory region, according to an example embodiment.

FIG. 8 is a diagram for describing a method for monitoring a status of a memory region, according to an example embodiment.

FIG. 9 is a diagram illustrating available memory conditions in detail, according to an example embodiment.

DETAILED DESCRIPTION

Figure 1:
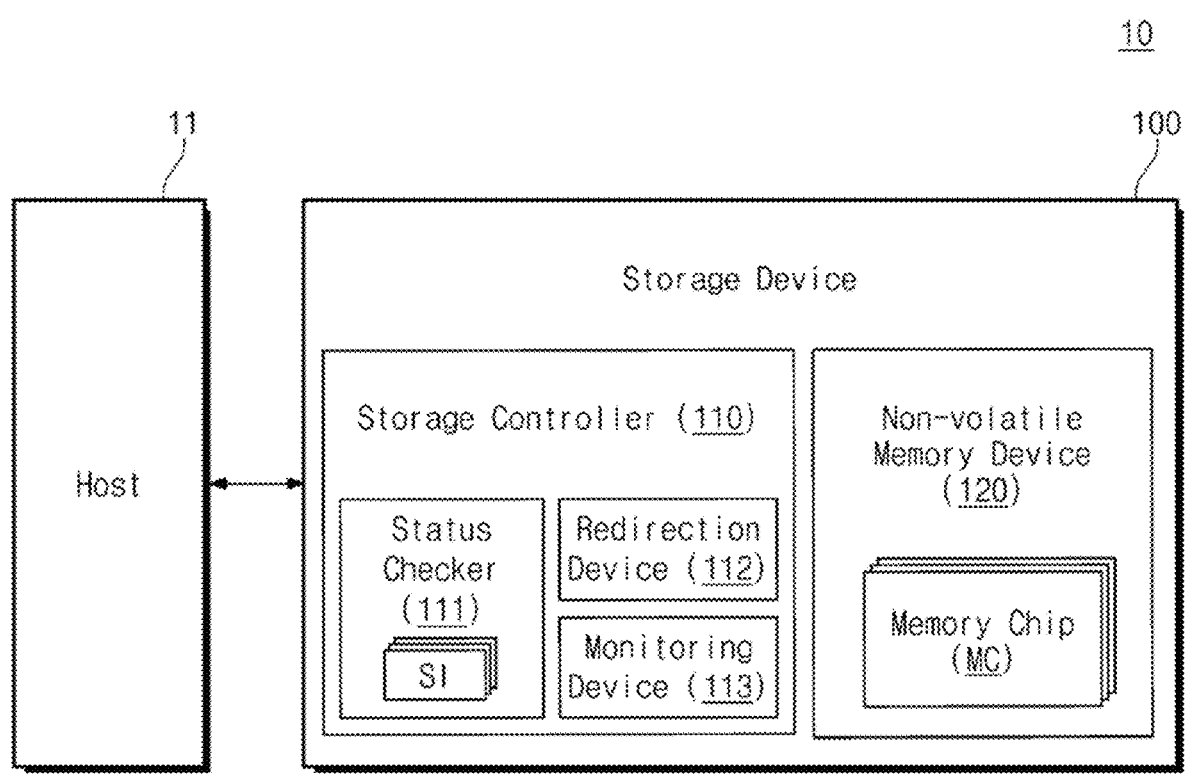
FIG. 1 is a block diagram of a storage system according to an example embodiment.

FIG. 1 is a block diagram of a storage system according to an example embodiment.

Referring to FIG. 1, a storage system 10 according to an example embodiment may include a host 11 and a storage device 100. The storage system 10 may be a computing system, which is configured to process a variety of information, such as a personal computer (PC), a notebook, a laptop, a server, a workstation, a tablet PC, a smartphone, a digital camera, a black box, etc.

The host 11 may control overall operations of the storage system 10. For example, the host 11 may store data in the storage device 100 or may read data stored in the storage device 100. Under control of the host 11, the storage device 100 may store data or may send the stored data to the host 11.

The storage device 100 may include a storage controller 110 and a non-volatile memory device 120.

The non-volatile memory device 120 may include a plurality of memory chips MC, which may be, e.g., a plurality of flash memory chips. Each of the plurality of memory chips MC may store data.

The storage controller 110 may store data in the non-volatile memory device 120 or may read data stored in the non-volatile memory device 120. The non-volatile memory device 120 may operate under control of the storage controller 110. The non-volatile memory device 120 may be, e.g., a NAND flash memory device or one of various storage devices, which may retain data stored therein even though a power is turned off, such as a PRAM, an MRAM, a RRAM, and an FRAM.

The storage controller 110 may include a status checker 111, a redirection device 112, and a monitoring device 113.

The status checker 111 may check a status of the non-volatile memory device 120 and may generate a status information set. The status information set may include a plurality of status information SI. The status information SI may be information indicating a status of a flash memory region (hereinafter referred to as a "memory region") (e.g., a flash memory based memory chip MC or a flash memory block in the memory chip MC). The status information SI will be described in more detail with reference to FIGS. 5A and 5B.

The status checker 111 may determine whether each of a plurality of memory regions satisfies available memory conditions, based on the plurality of status information SI. Each of the plurality of memory regions may be a flash memory region. The available memory conditions may be criteria for determining whether a corresponding memory region is available. The available memory conditions will be described in more detail with reference to FIG. 9.

The status checker 111 may determine whether each of the plurality of memory regions satisfies the available memory conditions, based on the plurality of status information SI, and may provide a result of the determination to the host 11 or the redirection device 112.

The redirection device 112 may be a device redirecting a write operation according to a write request. The redirection may mean to change a memory region where a write operation will be performed.

The redirection device 112 may communicate with the status checker 111. For example, when the status checker 111 determines that a first memory region corresponding to a write request received from the host 11 is not available, the redirection device 112 may, under control of the status checker 111, perform the write operation in a second memory region instead of the first memory region. The redirection device 112 may output redirection result information to the host 11. Workload unbalance between memory regions in the non-volatile memory device 120 may be solved, e.g., balanced, by the redirection of the redirection device 112. The redirection device 112 will be described in more detail with reference to FIGS. 7 and 10.

The monitoring device 113 may be a device that monitors a status of the non-volatile memory device 120. The monitoring device 113 may communicate with the status checker 111. For example, without a separate request from the host 11, the monitoring device 113 may monitor statuses of the memory regions of the non-volatile memory device 120 every reference time, i.e., periodically, and may update the plurality of status information SI of the status checker 111. The reference time may indicate a period by which the monitoring device 113 performs monitoring.

The status checker 111 may output monitoring information to the host 11 based on the plurality of status information SI thus updated. The host 11 may not request a write request for an unavailable memory region, based on the monitoring information. As such, workload unbalance between memory regions in the non-volatile memory device 120 may be solved, e.g., balanced. The monitoring device 113 will be described in more detail with reference to FIGS. 8 and 11.

As described above, according to an example embodiment, the storage controller 110 may redirect a write request for an unavailable memory region to another memory region. Also, the storage controller 110 may monitor a status of the non-volatile memory device 120 periodically without a separate request from the host 11, and may provide monitoring information to the host 11.

Figure 2:
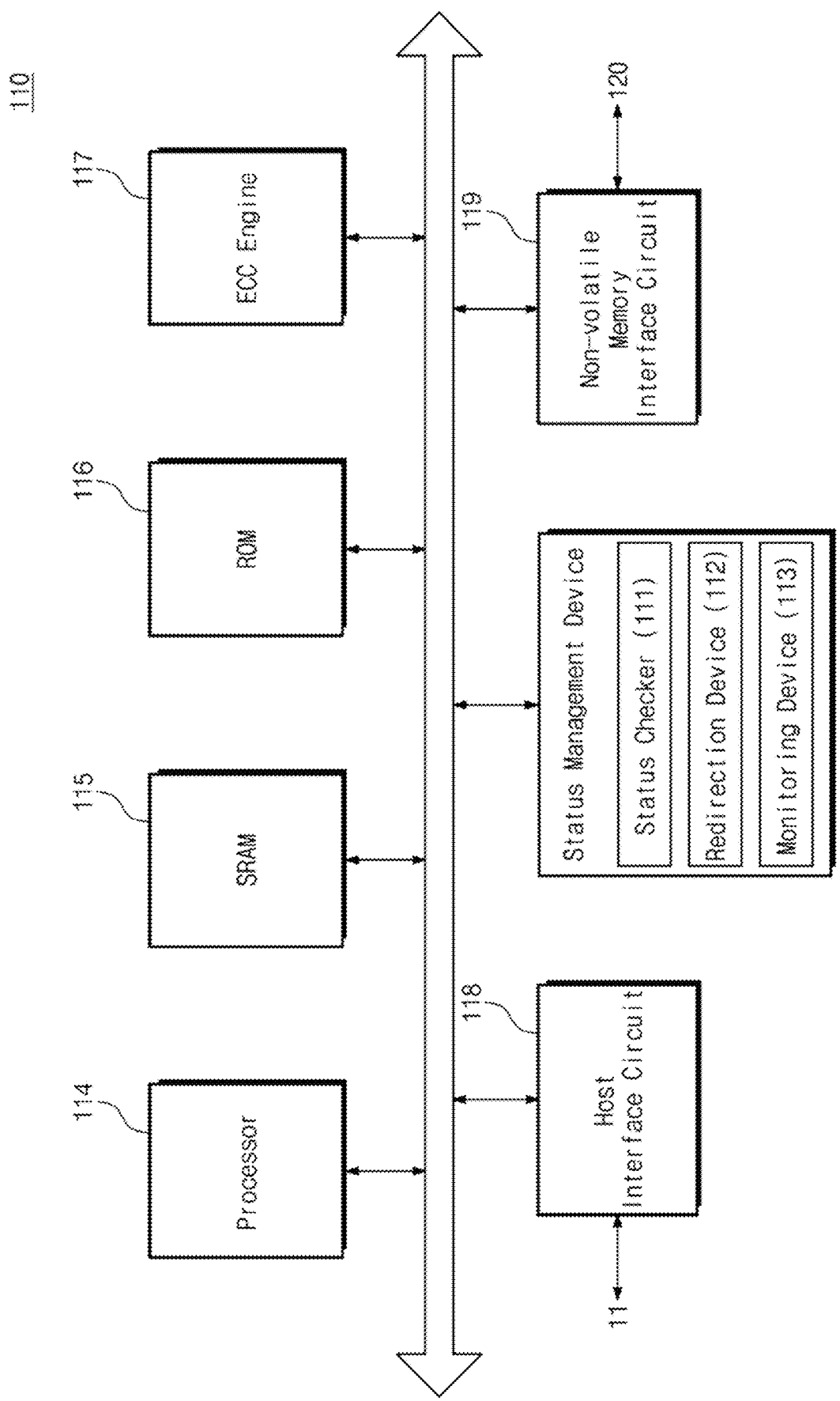
FIG. 2 is a block diagram illustrating a storage controller of FIG. 1 in detail, according to an example embodiment.

FIG. 2 is a block diagram illustrating a storage controller of FIG. 1 in detail, according to an example embodiment.

Referring to FIGS. 1 and 2, the storage controller 110 may communicate with the host 11 and the non-volatile memory device 120.

The storage controller 110 may include a processor 114, a static random access memory (SRAM) 115, a read only memory (ROM) 116, an error correcting code (ECC) engine 117, a host interface circuit 118, a status management device, and a non-volatile memory interface circuit 119.

The processor 114 may control overall operations of the storage controller 110.

The SRAM 115 may be used as a buffer memory, a cache memory, or a working memory of the storage controller 110.

The ROM 116 may store a variety of information that is used for the storage controller 110 to operate, e.g., in the form of firmware.

The ECC engine 117 may detect and correct an error of data read from the non-volatile memory device 120. In general, as the number of operations performed in the non-volatile memory device 120 increases (such as a write operation and an erase operation), an error level of the non-volatile memory device 120 may increase. The ECC engine 117 may have an error correction capacity of a given level. In the case where an error of data read from the non-volatile memory device 120 exceeds an error correction capacity of the ECC engine 117, the error of the data read from the non-volatile memory device 120 may not be corrected. To minimize the situation where an error is not corrected by the ECC engine 117, the status management device may distribute workloads of memory regions in the non-volatile memory device 120.

The host interface circuit 118 may provide for communications between the storage controller 110 and the host 11. The host interface circuit 118 may be implemented based on, e.g., at least one of various interfaces such as a SATA (Serial ATA) interface, a PCIe (Peripheral Component Interconnect Express) interface, a SAS (Serial Attached SCSI) interface, an NVMe (Nonvolatile Memory express) interface, and an UFS (Universal Flash Storage) interface. The host interface circuit 118 may output, to the host 11, information indicating that a first memory region of a plurality of memory regions in the non-volatile memory device 120 does not satisfy available memory conditions. The host interface circuit 118 may output, to the host 11, information indicating that a second memory region of a plurality of memory regions in the non-volatile memory device 120 satisfies the available memory conditions.

The status management device may include the status checker 111, the redirection device 112, and the monitoring device 113 described with reference to FIG. 1. The status management device may be provided in the form of software, hardware, or a combination thereof. In the case where the status management device is provided in the form of software, the status management device may be stored in the SRAM 115 and may be driven by the processor 114.

The host interface circuit 118 may receive redirection result information from the redirection device 112. The host interface circuit 118 may output the redirection result information to the host 11. The host interface circuit 118 may receive monitoring information from the status checker 111 or the monitoring device 113. The host interface circuit 118 may output the monitoring information to the host 11.

The non-volatile memory interface circuit 119 may provide for communications between the storage controller 110 and the non-volatile memory device 120. The non-volatile memory interface circuit 119 may be implemented based on, e.g., a NAND interface.

The status checker 111, the redirection device 112, the monitoring device 113, the processor 114, the SRAM 115, the ROM 116, the ECC engine 117, the host interface circuit 118, and the non-volatile memory interface circuit 119 may be interconnected through a bus.

Figure 3A:
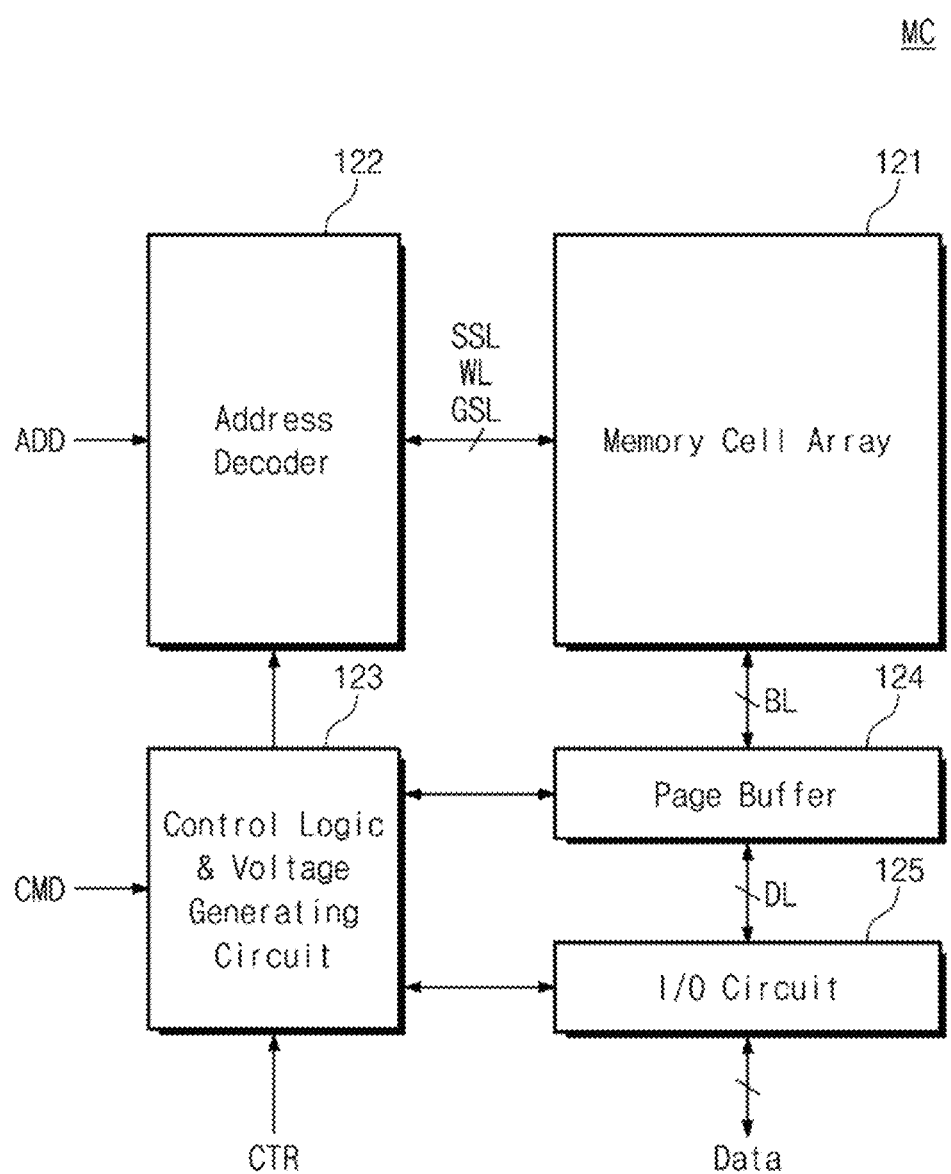
FIG. 3A is a block diagram illustrating a memory chip of FIG. 1 in detail, according to an example embodiment.
Figure 3B:
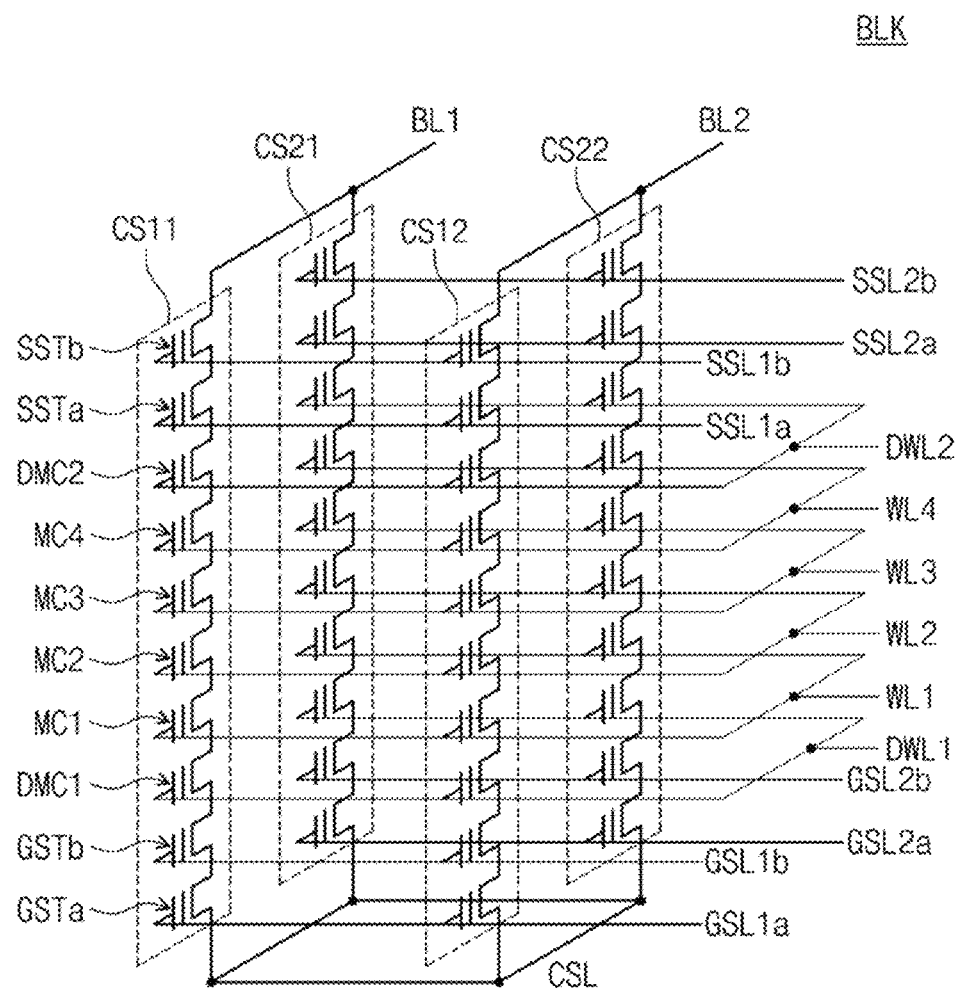
FIG. 3B is a diagram illustrating one memory block of a plurality of memory blocks in a memory cell array in FIG. 3A.

FIG. 3A is a block diagram illustrating a memory chip MC of FIG. 1 in detail, according to an example embodiment. FIG. 3B is a diagram illustrating one memory block BLK of a plurality of memory blocks in a memory cell array 121 in FIG. 3A.

Referring to FIGS. 1, 3A, and 3B, the non-volatile memory device 120 may include a plurality of memory chips MC. The memory chip MC may communicate with the storage controller 110. For example, the memory chip MC may receive an address ADD, a command CMD, and a control signal CTR from the storage controller 110. The memory chip MC may exchange data with the storage controller 110.

The memory chip MC may include the memory cell array 121, an address decoder 122, a control logic and voltage generating circuit 123, a page buffer 124, and an input/output (I/O) circuit 125.

The memory cell array 121 may include a plurality of memory blocks, e.g., a plurality of flash memory blocks. A structure of each of the plurality of memory blocks may be similar to a structure of the memory block BLK illustrated in FIG. 3B. The memory block BLK illustrated in FIG. 3B may correspond to, e.g., a physical erase unit of the non-volatile memory device 120, or a page unit, a word line unit, a sub-block unit, etc.

Referring to FIG. 3B, the memory block BLK may include a plurality of cell strings CS11, CS12, CS21, and CS22. The plurality of cell strings CS11, CS12, CS21, and CS22 may be arranged in a row direction and a column direction. For brevity of drawing, four cell strings CS11, CS12, CS21, and CS22 are illustrated in FIG. 3B, but the number of cell strings may be increased or decreased in the row direction or the column direction.

Cell strings placed at the same column from among the plurality of cell strings CS11, CS12, CS21, and CS22 may be connected with the same bit line. For example, the cell strings CS11 and CS21 may be connected with a first bit line BL1, and the cell strings CS12 and CS22 may be connected with a second bit line BL2. Each of the plurality of cell strings CS11, CS12, CS21, and CS22 may include a plurality of cell transistors. In each cell string, the plurality of cell transistors may be implemented with a charge trap flash (CTF) memory cell. The plurality of cell transistors may be stacked in a height direction that is a direction perpendicular to a plane (e.g., a semiconductor substrate (not illustrated)) defined by the row direction and the column direction.

In each cell string, the plurality of cell transistors may be connected in series between a corresponding bit line (e.g., BL1 or BL2) and a common source line CSL. For example, in each cell string, the plurality of cell transistors may include string selection transistors SSTa and SSTb, dummy memory cells DMC1 and DMC2, memory cells MC1 to MC4, and ground selection transistors GSTa and GSTb. The serially-connected string selection transistors SSTa and SSTb may be provided between the serially-connected memory cells MC1 to MC4 and a corresponding bit line (e.g., BL1 and BL2). The serially-connected ground selection transistors GSTa and GSTb may be provided between the serially-connected memory cells MC1 to MC4 and the common source line CSL.

The second dummy memory cell DMC2 may be provided between the serially-connected string selection transistors SSTa and SSTb and the serially-connected memory cells MC1 to MC4, and the first dummy memory cell DMC1 may be provided between the serially-connected memory cells MC1 to MC4 and the serially-connected ground selection transistors GSTa and GSTb.

In the plurality of cell strings CS11, CS12, CS21, and CS22, memory cells placed at the same height from among the memory cells MC1 to MC4 may share the same word line. For example, the first memory cells MC1 of the plurality of cell strings CS11, CS12, CS21, and CS22 may be placed at the same height from the substrate (not illustrated) and may share a first word line WL1. The second memory cells MC2 of the plurality of cell strings CS11, CS12, CS21, and CS22 may be placed at the same height from the substrate (not illustrated) and may share a second word line WL2. Likewise, the third memory cells MC3 of the plurality of cell strings CS11, CS12, CS21, and CS22 may be placed at the same height from the substrate (not illustrated) and may share a third word line WL3, and the fourth memory cells MC4 of the plurality of cell strings CS11, CS12, CS21, and CS22 may be placed at the same height from the substrate (not illustrated) and may share a fourth word line WL4.

Dummy memory cells placed at the same height from among the dummy memory cells DMC1 and DMC2 of the plurality of cell strings CS11, CS12, CS21, and CS22 may share the same dummy word line. For example, the first dummy memory cells DMC1 of the plurality of cell strings CS11, CS12, CS21, and CS22 may share a first dummy word line DWL1, and the second dummy memory cells DMC2 of the plurality of cell strings CS11, CS12, CS21, and CS22 may share a second dummy word line DWL2.

In the plurality of cell strings CS11, CS12, CS21, and CS22, string selection transistor placed at the same height and the same row from among the string selection transistor SSTa or SSTb of the plurality of cell strings CS11, CS12, CS21, and CS22 may be connected with the same string selection line. For example, the string selection transistors SSTb of the cell strings CS11 and CS12 may share a string selection line SSL1b, and the string selection transistors SSTa of the cell strings CS11 and CS12 may share a string selection line SSL1a. The string selection transistors SSTb of the cell strings CS21 and CS22 may share a string selection line SSL2b, and the string selection transistors SSTa of the cell strings CS21 and CS22 may share a string selection line SSL2a.

Ground selection transistors placed at the same height and the same row from among the ground selection transistors GSTa and GSTb of the plurality of cell strings CS11, CS12, CS21, and CS22 may share the same ground selection line. For example, the ground selection transistors GSTb of the cell strings CS11 and CS12 may be connected with a ground selection line GSL1b, and the ground selection transistors GSTa of the cell strings CS11 and CS12 may be connected with a ground selection line GSL1a. The ground selection transistors GSTb of the cell strings CS21 and CS22 may be connected with a ground selection line GSL2b, and the ground selection transistors GSTa of the cell strings CS21 and CS22 may be connected with a ground selection line GSL2a.

The memory block BLK illustrated in FIG. 3B is an example, and it will be understood that the number of cell strings may be increased or decreased, and the number of rows of cell strings and the number of columns of cell strings may be increased or decreased depending on the number of cell strings. Also, in the memory block BLK, the number of cell transistors may be increased or decreased, the height of the memory block BLK may be increased or decreased depending on the number of cell transistors, and the number of lines connected with the cell transistors may be increased or decreased depending on the number of cell transistors.

A memory region may correspond to one of the plurality of memory chips MC in one storage device 100, may correspond to one of the plurality of memory blocks BLK in one memory chip MC, or may correspond to one page, one word line, one sub memory block, etc., in the memory block BLK. A memory region may refer to any area that is physically separated to store data in the non-volatile memory device 120.

The status checker 111 of the storage controller 110 may determine whether each of a plurality of memory regions satisfies the available memory conditions, based on the plurality of status information SI.

Referring again to FIGS. 1 and 3A, the address decoder 122 may receive the address ADD from the storage controller 110. The address decoder 122 may be connected with the memory cell array 121 through string selection lines SSL, word lines WL, and ground selection lines GSL. The address decoder 122 may decode the address ADD and may control voltages to be applied to the string selection lines SSL, the word lines WL, and the ground selection lines GSL based on a decoding result.

The control logic and voltage generating circuit 123 may receive the command CMD and the control signal CTR from the storage controller 110. The control logic and voltage generating circuit 123 may control the address decoder 122, the page buffer 124, and the I/O circuit 125 based on the command CMD and the control signal CTR. The control logic and voltage generating circuit 123 may generate various voltages (e.g., read voltages, program voltages, verification voltages, and erase voltages) necessary for the non-volatile memory device 120 to operate.

The page buffer 124 may be connected with the memory cell array 121 through bit lines BL. The page buffer 124 may receive data from the I/O circuit 125 through data lines DL. The page buffer 124 may control the bit lines BL based on the received data such that data are stored in the memory cell array 121. The page buffer 124 may read data stored in the memory cell array 121 by sensing voltages of the bit lines BL. The page buffer 124 may provide the read data to the I/O circuit 125 through the data lines DL.

The I/O circuit 125 may be connected with the page buffer 124 through the data lines DL. The I/O circuit 125 may provide data received from the storage controller 110 to the page buffer 124 through the data lines DL. The I/O circuit 125 may output the data received through the data lines DL to the storage controller 110.

The address ADD, the command CMD, the control signal CTR, and the data described with reference to FIG. 3A may be transmitted/received through the non-volatile memory interface circuit 119 of the storage controller 110.

Figure 4:
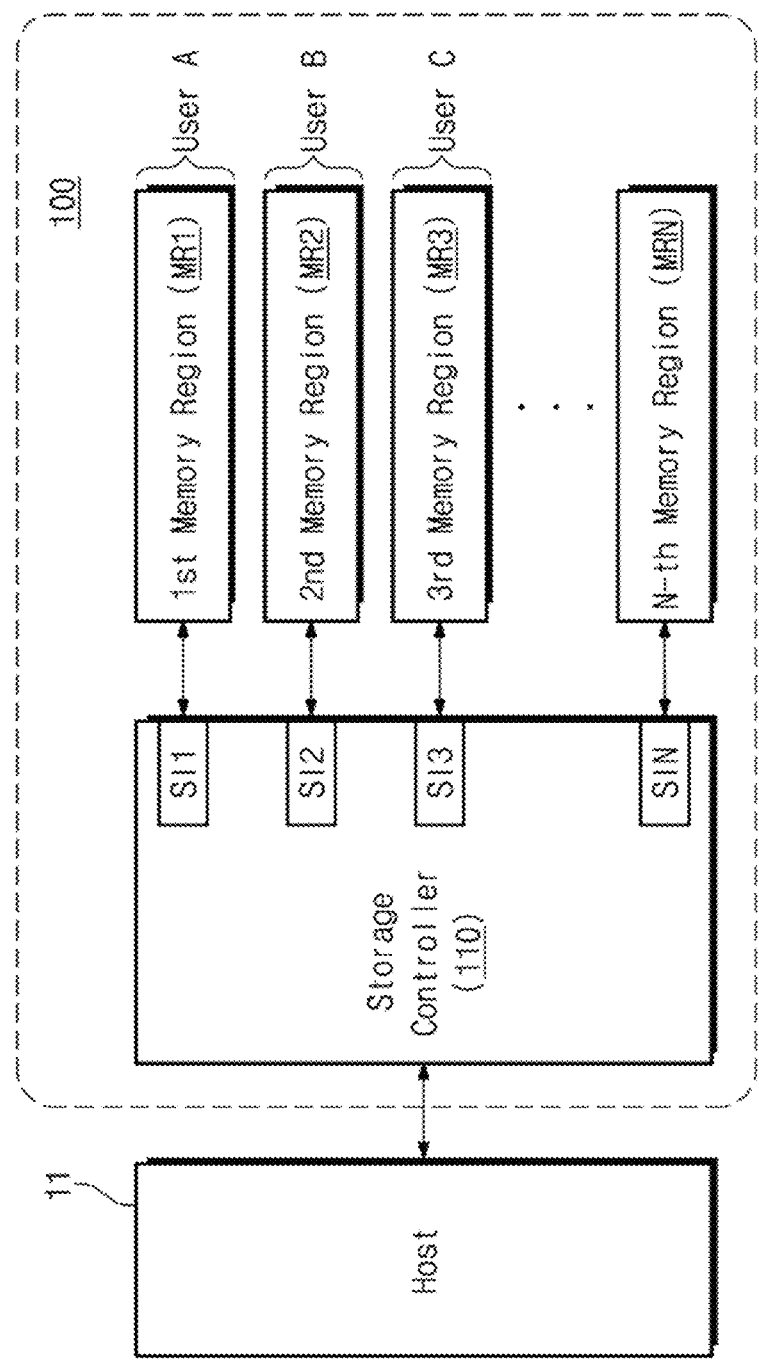
FIG. 4 is a block diagram illustrating a storage device operating in a multi-tenancy environment, according to an example embodiment.

FIG. 4 is a block diagram illustrating a storage device operating in a multi-tenancy environment, according to an example embodiment.

Referring to FIG. 4, the storage device 100 may communicate with the host 11.

The storage device 100 may include the storage controller 110 and a plurality of memory regions MR1 to MRN. For example, the plurality of memory regions MR1 to MRN may be physically separated memory regions in the non-volatile memory device 120 of FIG. 1.

The storage controller 110 may generate the status information set. The status information set may include the plurality of status information SI, which may be, e.g., SI1 to SIN. The plurality of status information SI1 to SIN may correspond to the plurality of memory regions MR1 to MRN, respectively. For example, the first status information SI1 may indicate a status of the first memory region MR1, the second status information SI2 may indicate a status of the second memory region MR2, etc.

The storage device 100 may operate in the multi-tenancy environment. The multi-tenancy environment may mean an environment in which the same service is provided to multiple users. For example, the storage device 100 may be used as a storage medium of a server for cloud computing. In the multi-tenancy environment, to reduce the interference between users and to reinforce security, the users may use different memory regions. For example, user A may use the first memory region MR1, user B may use the second memory region MR2, and user C may use the third memory region MR3.

In general, an excessive workload may be focused on a specific memory region depending on the inclination of the user, a size of data, etc. For example, in the case where user A frequently uploads or downloads a large amount of data, data processing in the first memory region MR1 may fail, the first memory region MR1 may be worn out, or data processing in the first memory region MR1 may be delayed. According to an example embodiment, the storage device 100 may allocate an additional memory region (e.g., the fourth memory region MR4) to user A, or may allocate the second memory region MR2, which is allocated to user B but has a low frequency of use, to both user A and user B.

In the case where the storage device 100 operates in a single-tenancy environment in which all the memory regions MR1 to MRN are allocated to a specific user, data for the specific user may be uniformly distributed into the plurality of memory regions MR1 to MRN. On the other hand, in the case of the multi-tenancy environment, as the plurality of memory regions MR1 to MRN are exclusively allocated to multiple users, the unbalance of workload may occur.

The multi-tenancy environment is described by way of an example with reference to FIG. 4 for a case in which an unbalanced workload may occur, but the storage device 100 may also be implemented to operate in the single-tenancy environment or in a personal computing device, and may provide workload balancing, efficient processing, and/or security of associated data, and for data to be evenly stored in a plurality of memory regions.

FIGS. 5A and 5B are diagrams for describing status information of a memory region, according to an example embodiment. FIG. 5A is a diagram for describing status information about a specific memory region by way of example. FIG. 5B is a diagram for describing a plurality of status information respectively corresponding to a plurality of memory regions by way of example.

Status information for a specific memory region will be described with reference to FIG. 5A. The status information may be used to determine whether a corresponding memory region is available. The case where a memory region is unavailable may be determined by multiple factors. Accordingly, the status information may include multiple sub conditions corresponding to multiple factors. The detailed contents of the status information will be described with reference to an index, contents, and a value.

The status information may include information about an average erase count. For example, referring to index 1, the status information may include a value corresponding to an average erase count. The average erase count may indicate an average of values obtained by counting erase operations each performed on a plurality of memory cells in the corresponding memory region. When a program operation and an erase operation are excessively performed in the corresponding memory region, the corresponding memory region may be worn out, and thus, the reliability of data may be reduced. To address this issue, a storage controller may determine a memory region having a high average erase count as unavailable.

The status information may include information about a valid page count (VPC) ratio. For example, referring to index 2, the status information may include a value corresponding to a VPC ratio. The VPC ratio may indicate a ratio of used pages to all pages in a corresponding memory region. A page may be a unit by which the page buffer 124 of FIG. 3A processes data, and may correspond to memory cells of the memory block BLK of FIG. 3B, which are connected with one word line. When a VPC ratio of a corresponding memory region is 100%, the memory region may be in a state where a capacity is full (i.e., the corresponding memory region is unavailable).

The status information may include information about a number of bad blocks. For example, referring to index 3, the status information may include a value corresponding to the number of bad blocks. A bad block may be a memory block that is initially damaged in a manufacturing phase or may be a memory block that is damaged later, e.g., after iterations of program and erase operations. A bad block may be a memory block incapable of normally storing data. In the case where a memory region corresponds to one memory chip, a bad block may correspond to a memory block, in the case where a memory region corresponds to a memory block, a bad block may correspond to a sub block in the memory block.

The status information may include information about a write amplification factor (WAF). For example, referring to index 4, the status information may include a value corresponding to a WAF. A WAF may be a value obtained by dividing a size of data written in a memory region by a size of data requested from a host. For an additional operation such as a garbage collection operation, a storage device may write data, the amount of which is larger than that of data requested from a host. As a size of the WAF becomes smaller, a workload of a storage device may decrease. In general, a size of the WAF is not less than "1". The WAF may be used as one of factors for determining a workload of a memory region.

The status information may include information about a memory usage ratio. For example, referring to index 5, the status information may include a value corresponding to a memory usage ratio. A memory usage ratio may indicate how much a corresponding memory region is used depending on a write operation, a read operation, a garbage collection operation, a defense code, etc. A defense code may mean an algorithm for suppressing or restoring data damage of a storage device. Because the VPC ratio indicates a data storage capacity of a memory region and the memory usage ratio indicates how much an operation associated with data processing is performed, the memory usage ratio is distinguishable from the VPC ratio. A state where a memory usage ratio is high may be referred to as a "busy state", and a state where a memory usage ratio is low may be referred to as an "idle state".

As described above, according to an example embodiment, a storage controller may include a plurality of status information respectively corresponding to a plurality of memory regions. The plurality of status information may include one or more of the average erase count of the corresponding memory region, the VPC ratio of the corresponding memory region, the number of bad blocks of the corresponding memory region, the WAF of the corresponding memory region, and the memory usage ratio of the corresponding memory region.

Referring to FIG. 5B, the plurality of status information SI1 to SI4 respectively corresponding to the plurality of memory regions MR1 to MR4 are illustrated.

The first status information SI1 may indicate a status of the first memory region MR1. For example, the first status information SI1 may indicate that the average erase count is 200, the VPC ratio is 100%, the number of bad blocks is 6, the WAF is 5, and the memory usage ratio is 65%.

The second status information SI2 may indicate a status of the second memory region MR2. For example, the second status information SI2 may indicate that the average erase count is 300, the VPC ratio is 70%, the number of bad blocks is 10, the WAF is 2, and the memory usage ratio is 85%.

The third status information SI3 may indicate a status of the third memory region MR3. For example, the third status information SI3 may indicate that the average erase count is 200, the VPC ratio is 80%, the number of bad blocks is 5, the WAF is 4, and the memory usage ratio is 30%.

The fourth status information SI4 may indicate a status of the fourth memory region MR4. For example, the fourth status information SI4 may indicate that the average erase count is 500, the VPC ratio is 70%, the number of bad blocks is 7, the WAF is 1, and the memory usage ratio is 90%.

The storage controller 110 may determine whether the respective memory regions MR1 to MR4 are available, based on the plurality of status information SI1 to SI4. For example, because the VPC ratio in the first status information SI1 is 100%, the storage controller 110 may determine the first memory region MR1 as unavailable. Because the number of bad blocks in the second status information SI2 is more than the number of bad blocks corresponding to each of the remaining status information SI1, SI3, and SI4, the storage controller 110 may determine the second memory region MR2 as unavailable. Because the average erase count in the fourth status information SI4 is greater than the average erase count corresponding to each of the remaining status information SI1, SI2, and SI3, the storage controller 110 may determine the fourth memory region MR4 as unavailable. The storage controller 110 may determine the third memory region MR3 as available, based on the third status information SI3. However, the availability of the memory regions may be variously determined, and the available memory conditions will be described in detail with reference to FIG. 9.

Figure 6A:
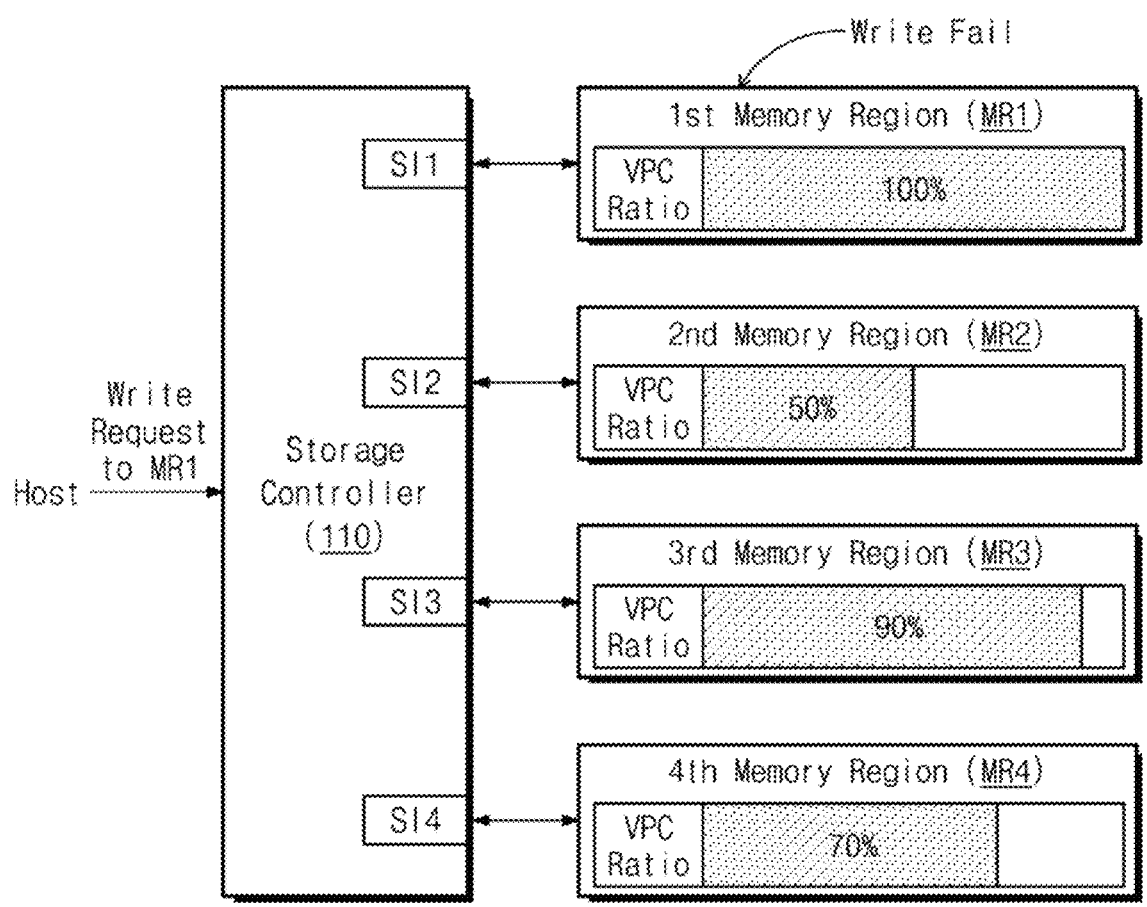
FIGS. 6A, 6B, and 6C are diagrams for describing a memory region, on which a workload is concentrated, according to an example embodiment.
Figure 6B:
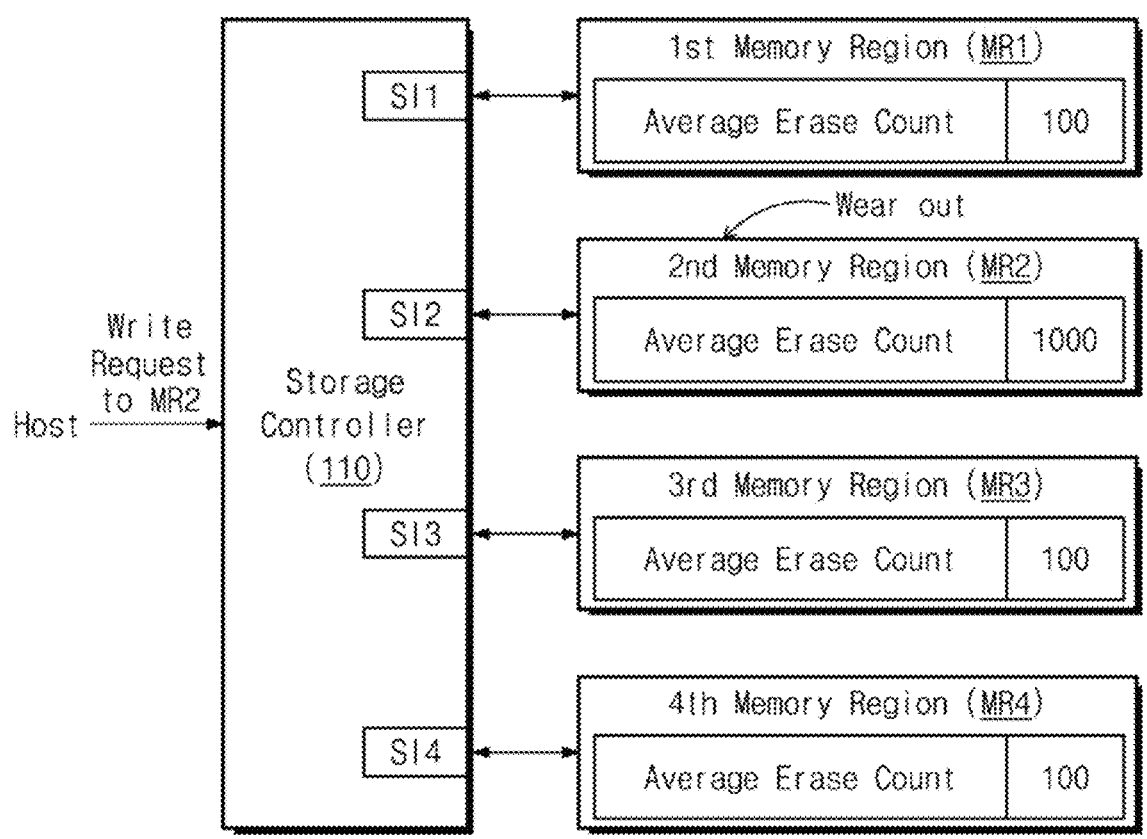
Figure 6C:
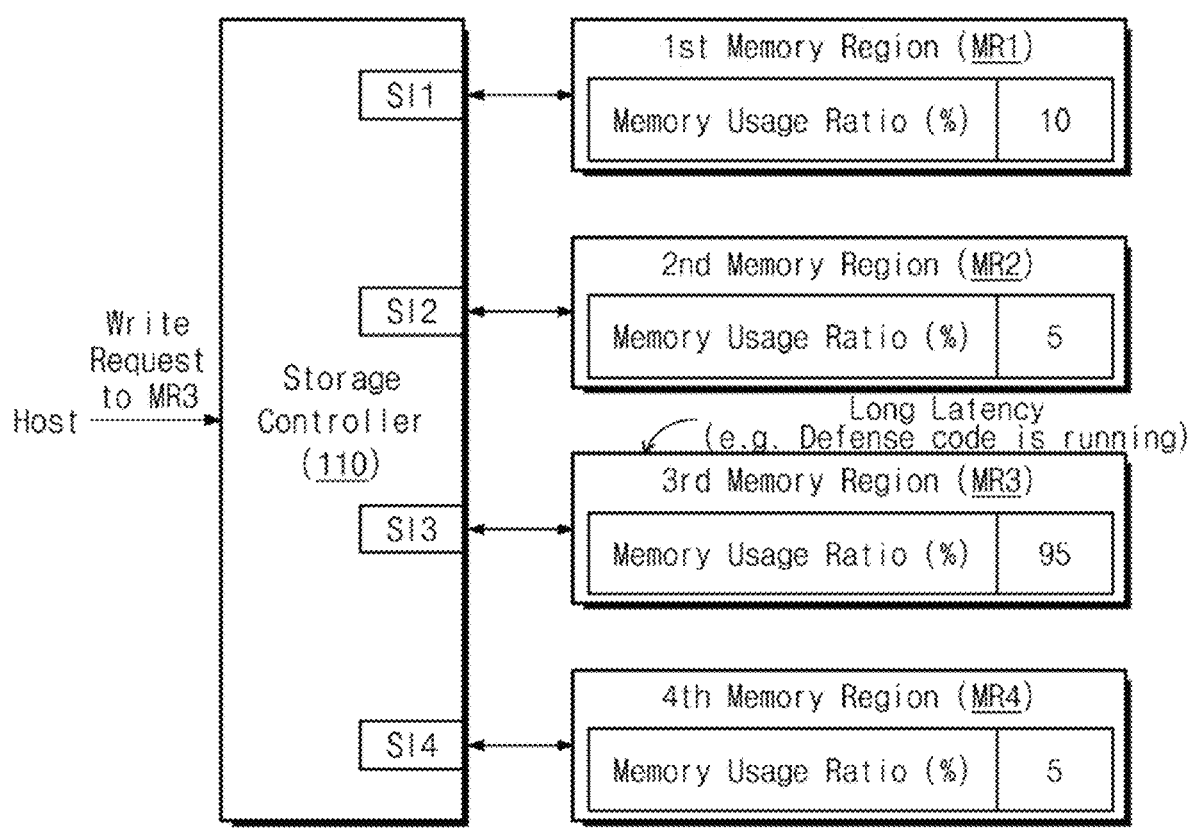

FIGS. 6A, 6B, and 6C are diagrams for describing a memory region, on which a workload is concentrated, according to an example embodiment.

FIG. 6A describes a memory region where the VPC ratio is concentrated.

Referring to FIG. 6A, the storage controller 110 may have the first to fourth status information SI1 to SI4 stored therein. The first to fourth status information SI1 to SI4 may indicate VPC ratios of the first to fourth memory regions MR1 to MR4, respectively. In an example, the VPC ratios of the first to fourth memory regions MR1 to MR4 may be 100%, 50%, 90%, and 70%, respectively. The storage controller 110 may receive a write request for the first memory region MR1 from a host. Because the VPC ratio of the first memory region MR1 is 100%, a write operation in the first memory region MR1 may fail. The storage controller 110 may thus redirect the write request based on the first to fourth status information SI1 to SI4.

FIG. 6B describes a memory region where the average erase count is concentrated.

Referring to FIG. 6B, the storage controller 110 may include the first to fourth status information SI1 to SI4. The first to fourth status information SI1 to SI4 may indicate average erase counts of the first to fourth memory regions MR1 to MR4, respectively. In an example, the average erase counts of the first to fourth memory regions MR1 to MR4 may be 100, 1000, 100, and 100, respectively. The storage controller 110 may receive a write request for the second memory region MR2 from the host. Because the average erase count of the second memory region MR2 is relatively greater than the average erase counts of the remaining memory regions MR1, MR3, and MR4, the second memory region MR2 may wear out before the remaining memory regions MR1, MR3, and MR4. To prevent this issue, the storage controller 110 may thus redirect the write request based on the first to fourth status information SI1 to SI4.

FIG. 6C describes a memory region where the memory usage ratio is concentrated.

Referring to FIG. 6C, the storage controller 110 may include the first to fourth status information SI1 to SI4. The first to fourth status information SI1 to SI4 may indicate memory usage ratios of the first to fourth memory regions MR1 to MR4, respectively. In an example, the memory usage ratios of the first to fourth memory regions MR1 to MR4 may be 10%, 5%, 95%, and 5%, respectively. The storage controller 110 may receive a write request for the third memory region MR3 from the host. Because the memory usage ratio of the third memory region MR3 is high (e.g., as a defense code is running), a latency in the third memory region MR3 may be longer than latencies of the remaining memory regions MR1, MR2, and MR4. As such, in the case where a write request is processed in the third memory region MR3, data processing may be delayed. To prevent this issue, the storage controller 110 may thus redirect the write request based on the first to fourth status information SI1 to SI4.

As described above, cases where data processing may fail, a memory region may be worn out, and data processing may be delayed are described with reference to FIGS. 6A, 6B, and 6C by way of example. The present example embodiment may redirect a write request for an unavailable memory region, and may periodically monitor a status of a memory region and provide monitoring information to a host.

Figure 7:
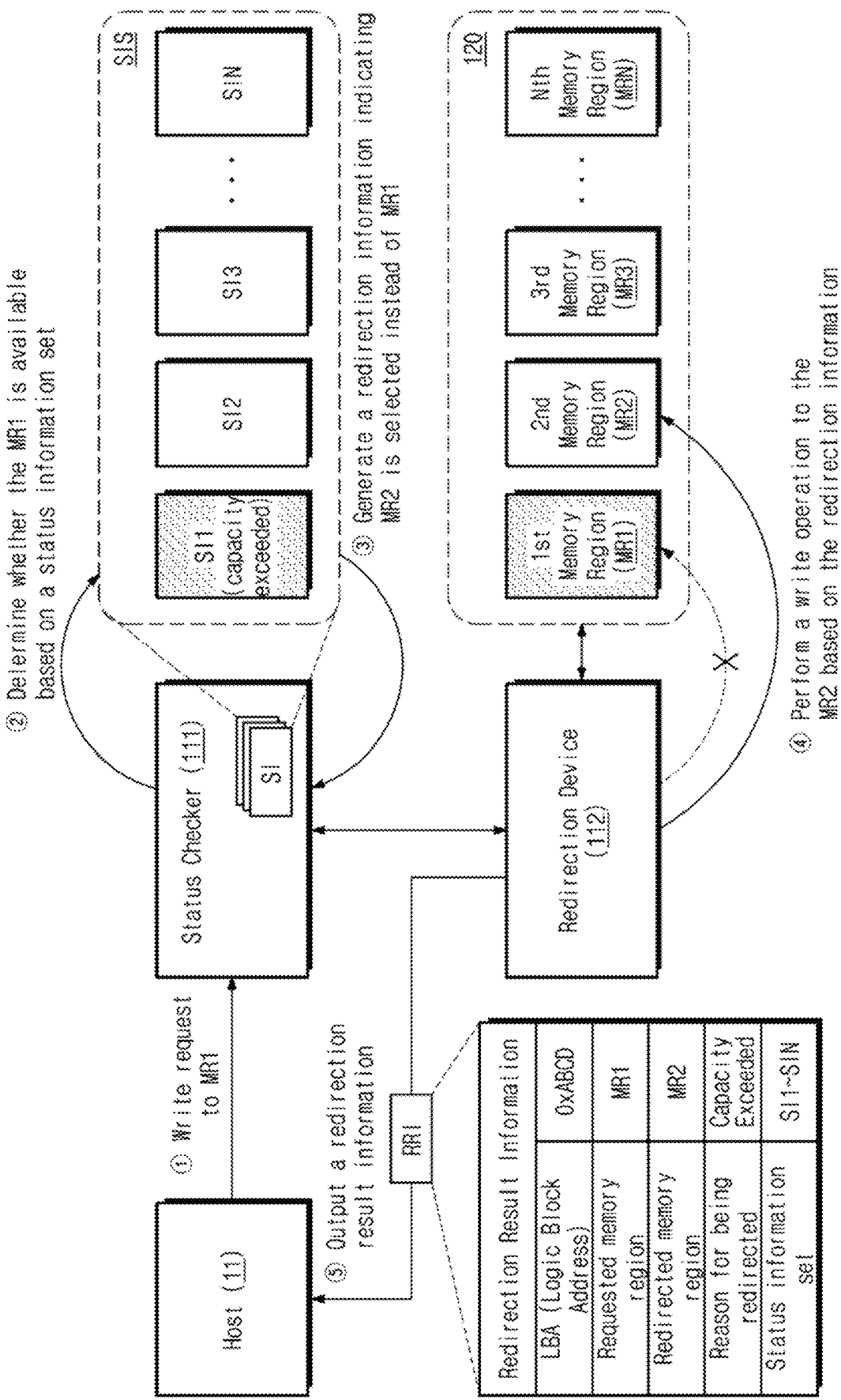
FIG. 7 is a diagram for describing a method for redirecting a write request, according to an example embodiment.

FIG. 7 is a diagram for describing a method for redirecting a write request, according to an example embodiment.

Referring to FIG. 7, a storage controller may communicate with the host 11 and may include the status checker 111 and the redirection device 112.

The status checker 111 may receive a write request for the first memory region MR1 from the host 11. The status checker 111 may check a status of the non-volatile memory device 120 and may generate a status information set SIS. The status information set SIS may include the plurality of status information SI1 to SIN. The plurality of status information SI1 to SIN may correspond to the plurality of memory regions MR1 to MRN, respectively.

The status checker 111 may determine whether the first memory region MR1 is available, based on the status information set SIS. In an example, the status checker 111 may determine that the first memory region MR1 is unavailable. For example, the first status information SI1 may indicate that a capacity of the first memory region MR1 is fully occupied (i.e., that the VPC ratio of the first memory region MR1 is 100%). The status checker 111 may generate redirection information indicating that the second memory region MR2 is selected instead of the first memory region MR1. The status checker 111 may output the redirection information to the redirection device 112.

The redirection device 112 may communicate with the non-volatile memory device 120. The redirection device 112 may perform a write operation on the second memory region MR2, based on the redirection information from the status checker 111. That is, the redirection device 112 may store data, which are requested from the host 11 so as to be written in the first memory region MR1, in the second memory region MR2, not the first memory region MR1. The redirection device 112 may output redirection result information RRI to the host 11.

The redirection result information RRI may be information indicating that write data according to the write request is processed in the second memory region MR2. For example, the redirection result information RRI may include, e.g., one or more of a logical block address (LBA) corresponding to a redirected memory region of the plurality of memory regions MR1 to MRN, information of a memory region corresponding to a write request, information of the redirected memory region, a reason for being redirected, and the status information set SIS.

For example, the redirection result information RRI may indicate that an LBA corresponding to the redirected memory region MR2 of the plurality of memory regions MR1 to MRN is "0xABCD". The redirection result information RRI may indicate that the memory region corresponding to the write request is the first memory region MR1. The redirection result information RRI may indicate that the redirected memory region is the second memory region MR2. The redirection result information RRI may indicate that the reason for being redirected is a capacity exceeded. The redirection result information RRI may include the status information set SIS including the plurality of status information SI1 to SIN.

The host 11 may receive the redirection result information RRI from the storage controller. The host 11 may recognize that data corresponding to the write request are stored in the second memory region MR2, based on the redirection result information RRI. To read the data redirected to the second memory region MR2, the host 11 may output, to the storage controller, a read request corresponding to the data of the write request and including information of the second memory region MR2 being the redirected memory region.

FIG. 8 is a diagram for describing a method for monitoring a status of a memory region, according to an example embodiment.

Referring to FIG. 8, a storage controller may communicate with the host 11 and may include the status checker 111 and the monitoring device 113.

The monitoring device 113 may communicate with the non-volatile memory device 120. The monitoring device 113 may monitor the plurality of memory regions MR1 to MRN in the non-volatile memory device 120. The monitoring device 113 may monitor the non-volatile memory device 120 periodically, e.g., every reference time, without a separate request from the host 11.

The monitoring device 113 may update the status information set SIS of the status checker 111 based on monitoring the plurality of memory regions MR1 to MRN. The status information set SIS may include the plurality of status information SI1 to SIN. The plurality of status information SI1 to SIN may correspond to the plurality of memory regions MR1 to MRN, respectively.

The status checker 111 may determine whether the plurality of memory regions MR1 to MRN are available, based on the updated status information set SIS. The status checker 111 may generate the monitoring information MI indicating whether the plurality of memory regions MR1 to MRN are available. For example, the updated first status information SI1 may indicate that a capacity of the first memory region MR1 is fully occupied (i.e., that the VPC ratio of the first memory region MR1 is 100%). The status checker 111 may determine the first memory region MR1 as unavailable, based on the updated first status information SI1. The status checker 111 may generate the monitoring information MI indicating that the first memory region MR1 of the plurality of memory regions MR1 to MRN is unavailable. The status checker 111 may output the monitoring information MI to the host 11.

The monitoring information MI may include, e.g., one or more of information of an unavailable memory region of the plurality of memory regions MR1 to MRN, a reason why the unavailable memory region is unavailable, information of an available memory region of the plurality of memory regions MR1 to MRN, and the updated status information set SIS.

For example, the monitoring information MI may indicate that an unavailable memory region of the plurality of memory regions MR1 to MRN is the first memory region MR1. The monitoring information MI may indicate that a reason why the unavailable memory region is unavailable is a capacity exceeded. The monitoring information MI may indicate that an available memory region of the plurality of memory regions MR1 to MRN is the second memory region MR2. The monitoring information MI may include the updated status information set SIS including the plurality of status information SI1 to SIN.

The host 11 may receive the monitoring information MI from the storage controller. The host 11 may determine that the first memory region MR1 is unavailable, based on the monitoring information MI. The host 11 may determine that the second memory region MR2 is available, based on the monitoring information MI. The host 11 may output, to the storage controller, a write request for the second memory region MR2 available from among the plurality of memory regions MR1 to MRN.

FIG. 9 is a diagram illustrating available memory conditions in detail, according to an example embodiment.

Referring to FIG. 9, the available memory conditions may be a reference for determining whether a corresponding memory region of a plurality of memory regions is available. For example, the status checker 111 of FIGS. 7 and 8 may determine whether each of the plurality of memory regions is available, based on available memory conditions of FIG. 9.

According to an example embodiment, the available memory conditions may include one or more of a condition associated with the average erase count, a condition associated with the VPC ratio, a condition associated with the number of bad blocks, a condition associated with the WAF, and a condition associated with the memory usage ratio.

In an example embodiment, a storage controller may determine whether a corresponding memory region is available based on the average erase count of the corresponding memory region.

For example, referring to index 1, when a value obtained by subtracting a minimum value of a plurality of average erase counts of the plurality of memory regions from the average erase count of the corresponding memory region is smaller than an erase count threshold value, the storage controller may determine the corresponding memory region as available. When the condition according to index 1 is satisfied, a corresponding bit flag may be determined as a first value (e.g., "1"). When the condition according to index 1 is not satisfied, the corresponding bit flag may be determined as a second value (e.g., "0").

That the condition according to index 1 is not satisfied may mean that an erase count of the corresponding memory region is considerably greater than those of the remaining memory regions of the plurality of memory regions. To prevent a reduction in performance of a storage device due to the concentrated wearing-out of the corresponding memory region, a memory region that does not satisfy the condition according to index 1 may be determined as unavailable.

In an example embodiment, the storage controller may determine whether a corresponding memory region is available based on the VPC ratio of the corresponding memory region.

For example, referring to index 2, when the VPC ratio of the corresponding memory region is smaller than a maximum value of a plurality of VPC ratios of the plurality of memory regions, the storage controller may determine the corresponding memory region as available. When the condition according to index 2 is satisfied, a corresponding bit flag may be determined as the first value (e.g., "1"). When the condition according to index 2 is not satisfied, the corresponding bit flag may be determined as the second value (e.g., "0").

That the condition according to index 2 is not satisfied may mean that a free capacity of the corresponding memory region of the plurality of memory regions is the smallest. To prevent data from being intensively stored in the corresponding memory region, i.e., to prevent a workload from being concentrated in the corresponding memory region in the following read operations, a memory region that does not satisfy the condition according to index 2 may be determined as unavailable.

In an example embodiment, the storage controller may determine whether a corresponding memory region is available based on the number of bad blocks in the corresponding memory region.

For example, referring to index 3, when the number of bad blocks of the corresponding memory region is smaller than a maximum value of the numbers of bad blocks of the plurality of memory regions, the storage controller may determine the corresponding memory region as available. When the condition according to index 3 is satisfied, a corresponding bit flag may be determined as the first value (e.g., "1"). When the condition according to index 3 is not satisfied, the corresponding bit flag may be determined as the second value (e.g., "0").

That the condition according to index 3 is not satisfied may mean that the number of bad blocks of the corresponding memory region of the plurality of memory regions is the greatest. In the case where write operations are further performed in the corresponding memory region, the number of bad blocks of the corresponding memory region may increase. In this case, an error that exceeds an error correction capability of an ECC engine in the storage controller may frequently occur, thereby causing the reduction in reliability of the storage device. To prevent this issue, a memory region that does not satisfy the condition according to index 3 may be determined as unavailable.

In an example embodiment, a storage controller may determine whether a corresponding memory region is available, based on the WAF of the corresponding memory region.

For example, referring to index 4, when the WAF of the corresponding memory region is smaller than a WAF threshold value, the storage controller may determine the corresponding memory region as available. When the condition according to index 4 is satisfied, a corresponding bit flag may be determined as the first value (e.g., "1"). When the condition according to index 4 is not satisfied, the corresponding bit flag may be determined as the second value (e.g., "0").

That the condition according to index 4 is not satisfied may mean that the corresponding memory region is inappropriate to process a write request. For example, in the case where a write request for storing data of 4 KB is received from a host, a memory region having a WAF of 10 stores data of 40 KB, but a memory region having a WAF of 2 stores data of 8 KB. To prevent a write operation from being performed in an inappropriate memory region having a high WAF, e.g., to prevent a resource of the storage device from being wasted, a memory region that does not satisfy the condition according to index 4 may be determined as unavailable.

In an example embodiment, the storage controller may determine whether a corresponding memory region is available based on the memory usage ratio of the corresponding memory region.

For example, referring to index 5, when the memory usage ratio of the corresponding memory region is smaller than a memory usage ratio threshold value, the storage controller may determine the corresponding memory region as available. When the condition according to index 5 is satisfied, a corresponding bit flag may be determined as the first value (e.g., "1"). When the condition according to index 5 is not satisfied, the corresponding bit flag may be determined as the second value (e.g., "0").

That the condition according to index 5 is not satisfied may mean that the corresponding memory region fails to process a write request because of processing any other operation (e.g., another write request, another read request, a garbage collection operation, or a defense code). For example, when the memory usage ratio of the corresponding memory region is 100%, because the corresponding memory region is capable of processing a write request after completing at least a portion of a previously requested operation, a speed in which data are processed may decrease. To prevent this issue, a memory region that does not satisfy the condition according to index 5 may be determined as unavailable.

Figure 10:
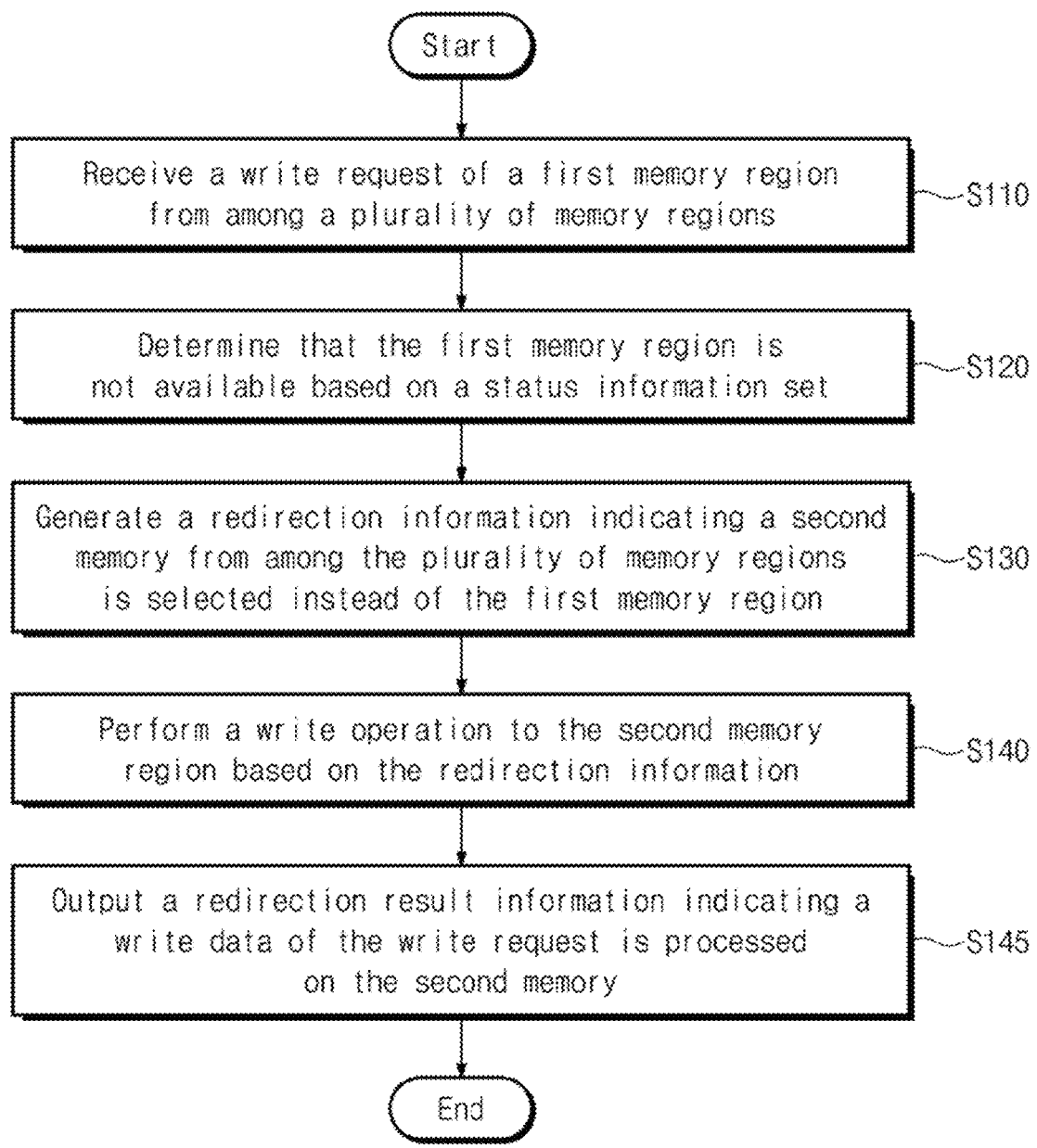
FIG. 10 is a flowchart for describing a method for redirecting a write request, according to an example embodiment.

FIG. 10 is a flowchart for describing a method for redirecting a write request, according to an example embodiment.

An operating method of a storage controller that redirects a write request will be described with reference to FIG. 10. The storage controller may communicate with a host and a plurality of memory regions.

In operation S110, the storage controller may receive a write request for a first memory region of the plurality of memory regions from the host. In an example embodiment, the plurality of memory regions may respectively correspond to a plurality of memory chips in one storage device or may respectively correspond to a plurality of memory blocks in one memory chip.

In operation S120, the storage controller may determine that the first memory region is unavailable, based on a status information set. The status information set may include a plurality of status information respectively corresponding to the plurality of memory regions. The status information may include one or more of the average erase count of a corresponding memory region, the VPC ratio of the corresponding memory region, the number of bad blocks of the corresponding memory region, the WAF of the corresponding memory region, and the memory usage ratio of the corresponding memory region. In an example embodiment, the storage controller may determine that the first memory region is unavailable based on the available memory conditions of FIG. 9.

In operation S130, the storage controller may generate redirection information indicating that a second memory region of the plurality of memory regions is selected instead of the first memory region.

In operation S130 the storage controller may determine that the second memory region satisfies the available memory conditions, based on the status information set. Operation S130 may include selecting the second memory region satisfying the available memory conditions and generating the redirection information. In this case, the available memory conditions may be similar to the available memory conditions of FIG. 9.

In operation S140, the storage controller may perform a write operation in the second memory region, based on the redirection information generated in operation S130. Operation S140 may include updating status information of the second memory region, in the status information set, based on the write operation.

In operation S145, the storage controller may output, to the host, redirection result information indicating that write data of the write request are processed in the second memory region. In an example embodiment, the redirection result information may include one or more of a logical block address corresponding to a redirected memory region of the plurality of memory regions, information of a memory region corresponding to a write request, information of the redirected memory region, a reason for being redirected, and a status information set.

In an example embodiment, the operating method of the storage controller may further include receiving a read request, which corresponds to write data and includes information of a second memory region, from the host after performing operation S145.

Figure 11:
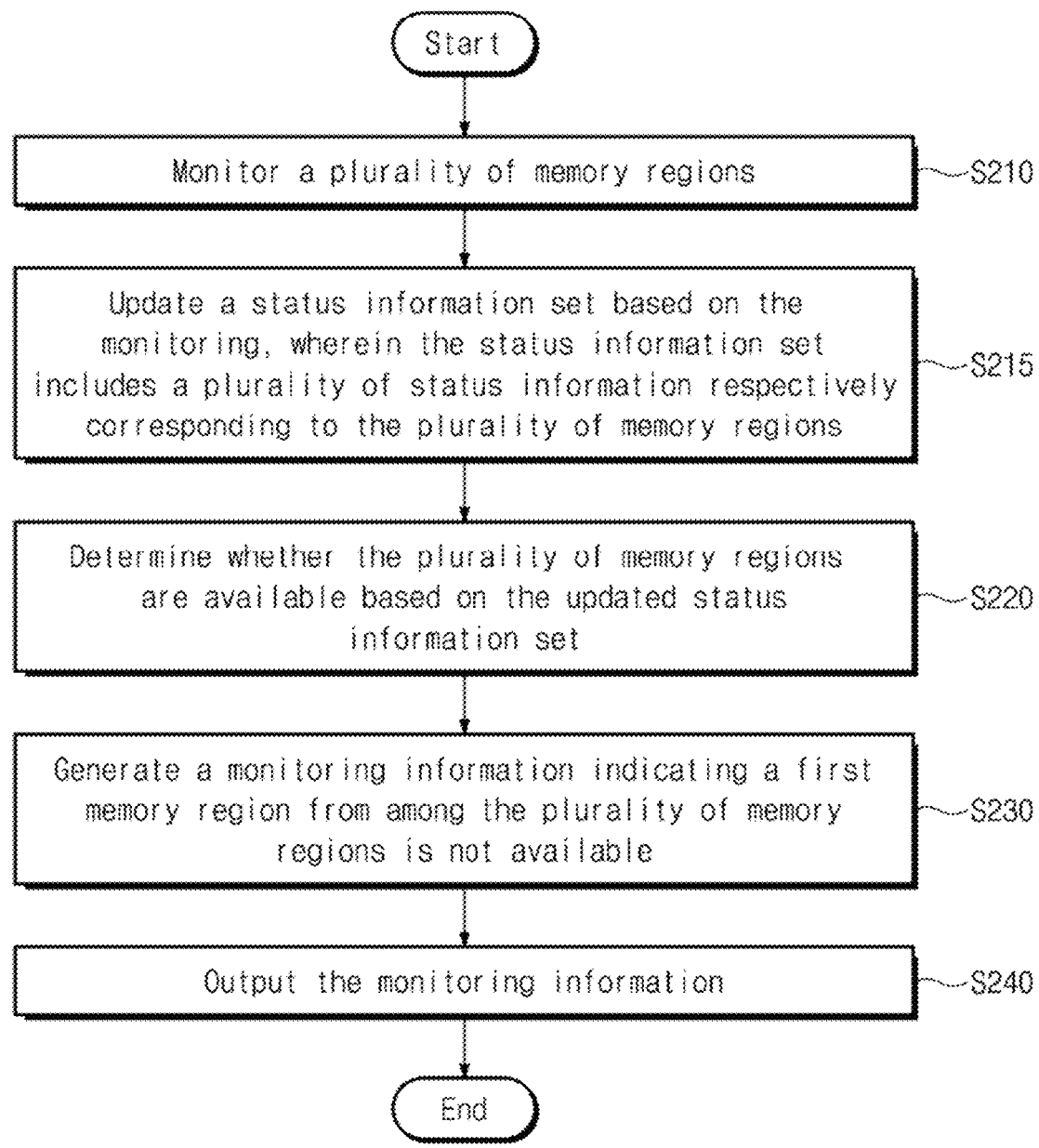
FIG. 11 is a flowchart for describing a method for monitoring a status of a memory region, according to an example embodiment.

FIG. 11 is a flowchart for describing a method for monitoring a status of a memory region, according to an example embodiment.

An operating method of a storage controller that monitors a status of a memory region will be described with reference to FIG. 11. The storage controller may communicate with a host and a plurality of memory regions.

In operation S210, the storage controller may monitor the plurality of memory regions. Operation S210 may include determining whether each of the plurality of memory regions satisfies available memory conditions, periodically, e.g., every reference time. In this case, the available memory conditions may be similar to the available memory conditions of FIG. 9.

In operation S215, the storage controller may update the status information set based on the monitoring in operation S210. The status information set may include a plurality of status information respectively corresponding to the plurality of memory regions. In an example embodiment, the status information may include one or more of the average erase count of a corresponding memory region, the VPC ratio of the corresponding memory region, the number of bad blocks of the corresponding memory region, the WAF of the corresponding memory region, and the memory usage ratio of the corresponding memory region.

In operation S220, the storage controller may determine that the plurality of memory regions are available, based on the updated status information set.

In operation S230, the storage controller may generate monitoring information indicating that a first memory region of the plurality of memory regions is not available. In an example embodiment, the monitoring information may include one or more of information of an unavailable memory region of the plurality of memory regions, a reason why the unavailable memory region is unavailable, information of an available memory region of the plurality of memory regions, and an updated status information set.

In operation S240, the storage controller may output the monitoring information to the host. In an example embodiment, in operation S240, the storage controller may output, to the host, the monitoring information including information indicating that the second memory region satisfies the available memory conditions.

The operating method of the storage controller may further include receiving a write request for the second memory region of the plurality of memory regions from the host after performing operation S240. Afterwards, the storage controller may perform a write operation in the second memory region based on the write request, and may update the status information of the second memory region, in the status information set, based on the write operation. The storage controller may receive a read request, which corresponds to the write operation and includes the information of the second memory region, from the host.

Figure 12:
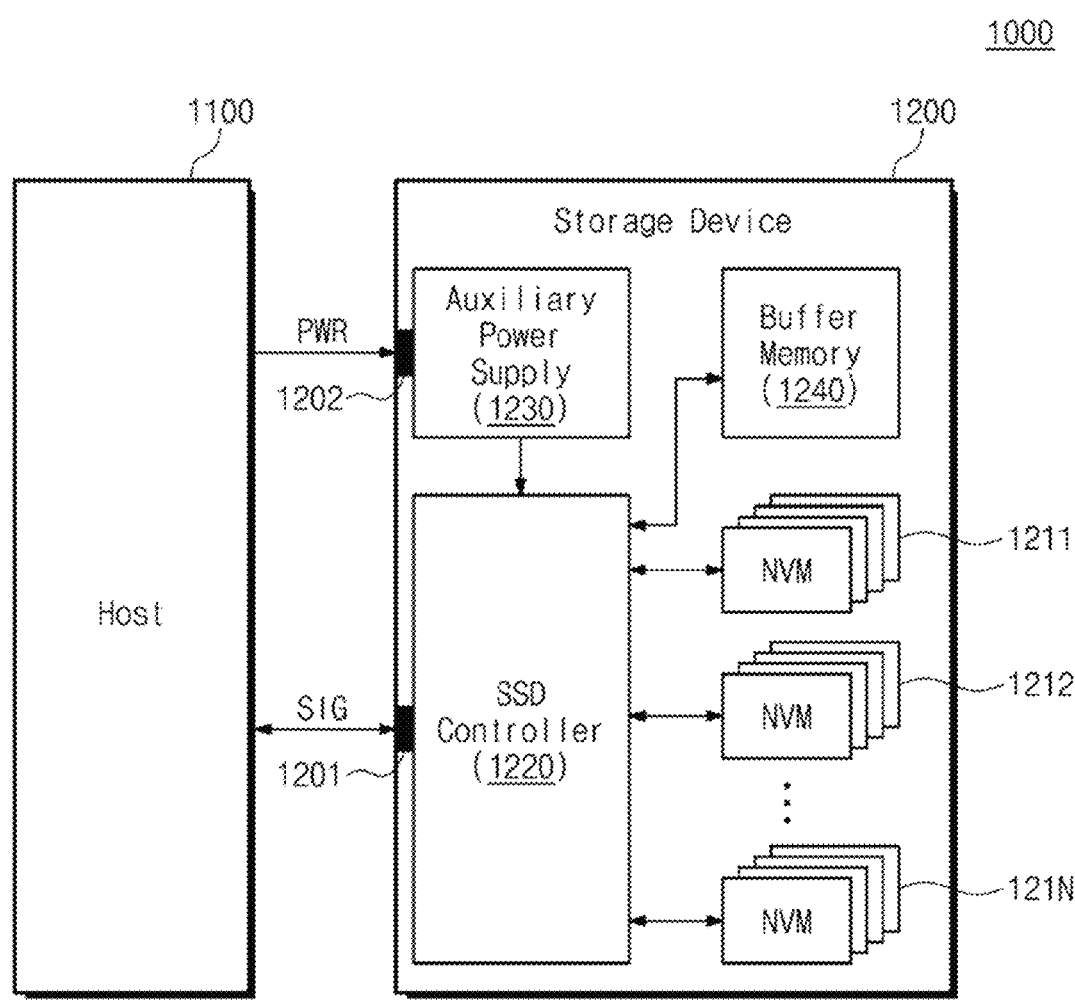
FIG. 12 is a block diagram of a solid state drive system to which a storage device according to an example embodiment is applied.

FIG. 12 is a block diagram of a solid state drive (SSD) system to which a storage device according to an example embodiment is applied.

Referring to FIG. 12, an SSD system 1000 may include a host 1100 and a storage device 1200.

The host 1100 may correspond to the host 11 of FIGS. 1, 4, 7, and 8.

The storage device 1200 may exchange a signal SIG with the host 1100 through a signal connector 1201, and may receive a power PWR through a power connector 1202.

The storage device 1200 may include a plurality of non-volatile memories 1211 to 121N, an SSD controller 1220, an auxiliary power supply 1230, and a buffer memory 1240.

The plurality of non-volatile memories 1211 to 121N may correspond to the plurality of memory chips MC of FIG. 1, or may correspond to the plurality of memory regions MR1 to MRN of FIGS. 4, 7, and 8. The plurality of non-volatile memories 1211 to 121N may operate under control of the SSD controller 1220.

The SSD controller 1220 may correspond to the storage controller 110 of FIGS. 1, 2, 4, 7, and 8. The SSD controller 1220 may perform the operating methods of FIGS. 10 and 11. The SSD controller 1220 may control the non-volatile memories 1211 to 121N in response to the signal SIG from the host 1100. In an example embodiment, as in the storage controller described with reference to FIGS. 1 to 11, the SSD controller 1220 may redirect a write request for an unavailable memory region (e.g., a non-volatile memory), may periodically monitor a status of a memory region, and may provide monitoring information to the host 1100. As such, the storage device 1200 may help to suppress a failure of data processing and wearing-out of a memory region, and may enable high data processing speed.

The auxiliary power supply 1230 may be connected with the host 1100 through the power connector 1202. The auxiliary power supply 1230 may be charged by the power PWR from the host 1100. When the power is not smoothly supplied from the host 1100, the auxiliary power supply 1230 may provide a power for driving the SSD device 1200.

The buffer memory 1240 may be used as a buffer memory of the storage device 1200.

By way of summation and review, a flash memory device may be used as a high-capacity storage medium. For example, the flash memory device may be used as a storage medium of a server for cloud computing. In a multi-tenancy environment where the same service is provided to multiple users, to reduce the interference between users and reinforce security, the flash memory device may be configured to independently manage data for each user in physically separated memory regions. However, an excessive workload may be focused on a specific memory region depending on the inclination of the user, a size of data, etc., which may cause data processing failure, a specific memory region becoming worn out, or data processing being delayed.

As described above, embodiments relate a storage controller redirecting a write operation and an operating method thereof. According to an example embodiment, a storage controller may redirect a write request for an unavailable memory region, periodically monitors a status of a memory region, and/or provide monitoring information to a host, which may help avoid a failure of data processing and wearing-out of a memory region, and may provide a high data processing speed. Another example embodiment is directed to a corresponding an operating method.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An operating method of a storage controller which communicates with a host and a plurality of flash memory regions, the method comprising:
   receiving a write request for a first flash memory region of the plurality of flash memory regions from the host;
   determining the first flash memory region as unavailable, based on a status information set;
   generating redirection information indicating that a second flash memory region of the plurality of flash memory regions is selected instead of the first flash memory region;
   performing a write operation in the second flash memory region based on the redirection information;
   updating status information of the second flash memory region in the status information set based on the write operation;
   outputting redirection result information indicating that write data of the write request are processed in the second flash memory region, to the host; and
   receiving a read request corresponding to the write data and including information of the second flash memory region from the host
   wherein the determining of the first flash memory region as unavailable based on the status information set includes:
   determining the first flash memory region as unavailable when a value obtained by subtracting a minimum value of a plurality of average erase counts of the plurality of flash memory regions from an average erase count of the first flash memory region is not smaller than a first threshold value.

2. The method as claimed in claim 1, wherein the status information set includes a plurality of status information respectively corresponding to the plurality of flash memory regions, and
   wherein each of the plurality of status information includes at least one of:
   an average erase count of a corresponding flash memory region;
   a valid page count ratio of the corresponding flash memory region;
   a number of bad blocks of the corresponding flash memory region;
   a write amplification factor of the corresponding flash memory region; and
   a memory usage ratio of the corresponding flash memory region.

3. The method as claimed in claim 1, wherein the determining of the first flash memory region as unavailable based on the status information set includes:
   determining the first flash memory region as unavailable when a valid page count ratio of the first flash memory region is not smaller than a maximum value of a plurality of valid page count ratios of the plurality of flash memory regions rather than determining the first flash memory region as unavailable when a value obtained by subtracting a minimum value of a plurality of average erase counts of the plurality of flash memory regions from an average erase count of the first flash memory region is not smaller than a first threshold value.

4. The method as claimed in claim 1, wherein the determining of the first flash memory region as unavailable based on the status information set includes:
   determining the first flash memory region as unavailable when a number of bad blocks of the first flash memory region is not smaller than a maximum value of the numbers of bad blocks of the plurality of flash memory regions rather than determining the first flash memory region as unavailable when a value obtained by subtracting a minimum value of a plurality of average erase counts of the plurality of flash memory regions from an average erase count of the first flash memory region is not smaller than a first threshold value.

5. The method as claimed in claim 1, wherein the determining of the first flash memory region as unavailable based on the status information set includes:
   determining the first flash memory region as unavailable when a write amplification factor of the first flash memory region is not smaller than a second threshold value rather than determining the first flash memory region as unavailable when a value obtained by subtracting a minimum value of a plurality of average erase counts of the plurality of flash memory regions from an average erase count of the first flash memory region is not smaller than a first threshold value.

6. The method as claimed in claim 1, wherein the determining of the first flash memory region as unavailable based on the status information set includes:
   determining the first flash memory region as unavailable when a memory usage ratio of the first flash memory region is not smaller than a third threshold value rather than determining the first flash memory region as unavailable when a value obtained by subtracting a minimum value of a plurality of average erase counts of the plurality of flash memory regions from an average erase count of the first flash memory region is not smaller than a first threshold value.

7. The method as claimed in claim 1, wherein the redirection result information includes at least one of:
   a logical block address corresponding to a redirected flash memory region of the plurality of flash memory regions;
   information of a flash memory region corresponding to the write request;
   information of the redirected flash memory region;
   a reason for being redirected; and
   the status information set.

8. The method as claimed in claim 1, wherein the generating of the redirection information indicating that the second flash memory region of the plurality of flash memory regions is selected instead of the first flash memory region includes:

determining that the second flash memory region satisfies available memory conditions, based on the status information set; and selecting the second flash memory region satisfying the available memory conditions and generating the redirection information, and wherein the available memory conditions include at least one of:

a condition where a value obtained by subtracting a minimum value of a plurality of average erase counts of the plurality of flash memory regions from an average erase count of the second flash memory region is smaller than a first threshold value;

a condition where a valid page count ratio of the second flash memory region is smaller than a maximum value of a plurality of valid page count ratios of the plurality of flash memory regions;

a condition where a number of bad blocks of the second flash memory region is smaller than a maximum value of the numbers of bad blocks of the plurality of flash memory regions;

a condition where a write amplification factor of the second flash memory region is smaller than a second threshold value; and a condition where a memory usage ratio of the second flash memory region is smaller than a third threshold value.

9. The method as claimed in claim 1, wherein the plurality of flash memory regions respectively correspond to a plurality of flash memory chips in one storage device, or respectively correspond to a plurality of flash memory blocks in one memory chip.

10. An operating method of a storage controller which communicates with a host and a plurality of flash memory regions, the method comprising:

monitoring the plurality of flash memory regions;

updating a status information set based on the monitoring, wherein the status information set includes a plurality of status information respectively corresponding to the plurality of flash memory regions;

determining whether the plurality of flash memory regions are available, based on the updated status information set;

generating monitoring information indicating that a first flash memory region of the plurality of flash memory regions is unavailable, based on a result of the determination; and outputting the monitoring information to the host wherein the monitoring of the plurality of flash memory regions includes:

periodically determining whether each of the flash memory regions satisfies an available memory condition, every reference time, wherein the available memory condition is a condition where a value obtained by subtracting a minimum value of a plurality of average erase counts of the plurality of flash memory regions from an average erase count of a corresponding flash memory region is smaller than a first threshold value.

11. The method as claimed in claim 10, wherein each of the plurality of status information includes at least one of:

an average erase count of a corresponding flash memory region;

a valid page count ratio of the corresponding flash memory region;

a number of bad blocks of the corresponding flash memory region;

a write amplification factor of the corresponding flash memory region; and a memory usage ratio of the corresponding flash memory region.

12. The method as claimed in claim 10, wherein the available memory condition is:

a condition where a valid page count ratio of the corresponding flash memory region is smaller than a maximum value of a plurality of valid page count ratios of the plurality of flash memory regions rather than a condition where a value obtained by subtracting a minimum value of a plurality of average erase counts of the plurality of flash memory regions from an average erase count of a corresponding flash memory region is smaller than a first threshold value.

13. The method as claimed in claim 10, wherein the monitoring information includes at least one of:

information of an unavailable flash memory region of the plurality of flash memory regions;

a reason why the unavailable flash memory region is unavailable;

information of an available flash memory region of the plurality of flash memory regions; and the updated status information set.

14. The method as claimed in claim 10, further comprising:

receiving a write request for a second flash memory region of the plurality of flash memory regions from the host, after outputting the monitoring information to the host, wherein the monitoring information includes information indicating that the second flash memory region satisfies available memory conditions.

15. The method as claimed in claim 14, further comprising:

performing a write operation in the second flash memory region based on the write request; and updating status information of the second flash memory region in the status information set based on the write operation.

16. The method as claimed in claim 15, further comprising:

receiving a read request corresponding to the write operation and including information of the second flash memory region from the host.

17. The method as claimed in claim 10, wherein the available memory condition is a condition where a number of bad blocks of the corresponding flash memory region is smaller than a maximum value of the numbers of bad blocks of the plurality of flash memory regions rather than a condition where a value obtained by subtracting a minimum value of a plurality of average erase counts of the plurality of flash memory regions from an average erase count of a corresponding flash memory region is smaller than a first threshold value.

18. A storage controller, comprising:

a status checker configured to generate a status information set corresponding to a plurality of flash memory regions including a first flash memory region and a second flash memory region, to determine that the first flash memory region does not satisfy available memory conditions based on the status information set, and to determine that the second flash memory region satisfies the available memory conditions based on the status information set, wherein the determining that the first flash memory region does not satisfy available memory conditions based on the status information set is conducted by determining the first flash memory region as unavailable when a value obtained by subtracting a minimum value of a plurality of average erase counts of the plurality of flash memory regions from an average erase count of the first flash memory region is not smaller than a first threshold value; and an interface circuit configured to output, to a host, first information indicating that the first flash memory region does not satisfy the available memory conditions and second information indicating that the second flash memory region satisfies the available memory conditions.

19. The storage controller as claimed in claim 18, further comprising:

a redirection device configured to communicate with the status checker, to redirect a write request for the first flash memory region to the second flash memory region, and to output redirection result information to the host through the interface circuit, wherein the redirection result information includes at least one of:

a logical block address corresponding to the second flash memory region redirected from among the plurality of flash memory regions;

information of the first flash memory region corresponding to the write request;

information of the redirected second flash memory region;

a reason for being redirected; and the status information set.

20. The storage controller as claimed in claim 18, further comprising:

a monitoring device configured to communicate with the status checker, to periodically monitor each of the plurality of flash memory regions every reference time, and to update the status information set of the status checker, wherein the status checker is further configured to output monitoring information to the host through the interface circuit based on the updated status information set, and wherein the monitoring information includes at least one of:

information of the first flash memory region being unavailable from among the plurality of flash memory regions;

a reason why the first flash memory region is unavailable;

information of the second flash memory region available from among the plurality of flash memory regions; and the updated status information set.

\* \* \* \* \*